(12) United States Patent
Momoka et al.

(10) Patent No.: US 11,841,632 B2
(45) Date of Patent: Dec. 12, 2023

(54) OPTICAL PRINT HEAD, IMAGE FORMING APPARATUS INCLUDING THE OPTICAL PRINT HEAD, AND MANUFACTURING METHOD OF THE OPTICAL PRINT HEAD

(71) Applicant: CANON KABUSHIKI KAISHA, Tokyo (JP)

(72) Inventors: Toshiki Momoka, Tokyo (JP); Hitoshi Iwai, Chiba (JP); Shinichiro Hosoi, Tokyo (JP); Takehiro Ishidate, Tokyo (JP); Daisuke Aruga, Chiba (JP); Ryota Fukumoto, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 78 days.

(21) Appl. No.: 17/514,334

(22) Filed: Oct. 29, 2021

(65) Prior Publication Data
US 2022/0050399 A1    Feb. 17, 2022

Related U.S. Application Data

(63) Continuation of application No. PCT/JP2020/019837, filed on May 13, 2020.

(30) Foreign Application Priority Data

May 14, 2019 (JP) ................................. 2019-091249

(51) Int. Cl.
G03G 15/04 (2006.01)
(52) U.S. Cl.
CPC . *G03G 15/04036* (2013.01); *G03G 15/04054* (2013.01)

(58) Field of Classification Search
CPC ......... G03G 15/04036; G03G 15/04054; B41J 2/447; B41J 2/45; H04N 1/036
See application file for complete search history.

(56) References Cited

U.S. PATENT DOCUMENTS

| 4,904,862 A | 2/1990 | Bertagne |
| 8,547,411 B2 | 10/2013 | Nagamine et al. |
| 10,281,835 B2 | 5/2019 | Fuyuno |
| 10,353,337 B2 | 7/2019 | Momoka et al. |
| 10,503,115 B2 | 12/2019 | Hosoi et al. |

(Continued)

FOREIGN PATENT DOCUMENTS

| JP | 5433541 B2 | 3/2014 |
| JP | 2018-086765 A | 6/2018 |

(Continued)

OTHER PUBLICATIONS

Machine Translation of JP 2018-183945. Nov. 2018. (Year: 2018).*
International Search Report and Written Opinion dated Jun. 16, 2020, in International Application No. PCT/JP2020/019837.

*Primary Examiner* — Carla J Therrien
(74) *Attorney, Agent, or Firm* — Venable LLP

(57) ABSTRACT

A holding member includes a first side wall portion and a second side wall portion, and a part of a surface of a substrate on a side opposite from a mounting surface and a holding member are fixed to each other by an adhesive. In the first side wall portion, an inserting hole is disposed opposing a corner portion as of the substrate in a widthwise direction of the substrate and also, in the second side wall portion, another inserting hole is disposed opposing another corner portion of the substrate.

16 Claims, 16 Drawing Sheets

(56) References Cited

U.S. PATENT DOCUMENTS

| | | |
|---|---|---|
| 10,551,786 B2 | 2/2020 | Iwai et al. |
| 10,564,589 B2 | 2/2020 | Hosoi et al. |
| 10,928,746 B2 | 2/2021 | Aruga et al. |
| 2011/0096133 A1* | 4/2011 | Nagamine ............... B41J 2/45 347/224 |
| 2016/0375699 A1* | 12/2016 | Yamamura ............... B41J 2/45 347/258 |
| 2018/0004118 A1* | 1/2018 | Kasuya ............ G03G 15/04054 |
| 2019/0346804 A1 | 11/2019 | Tamura et al. |
| 2020/0192236 A1 | 6/2020 | Otoguro et al. |

FOREIGN PATENT DOCUMENTS

| | | |
|---|---|---|
| JP | 2018-183945 A | 11/2018 |
| KR | 10-2006-0098180 A | 9/2006 |

\* cited by examiner

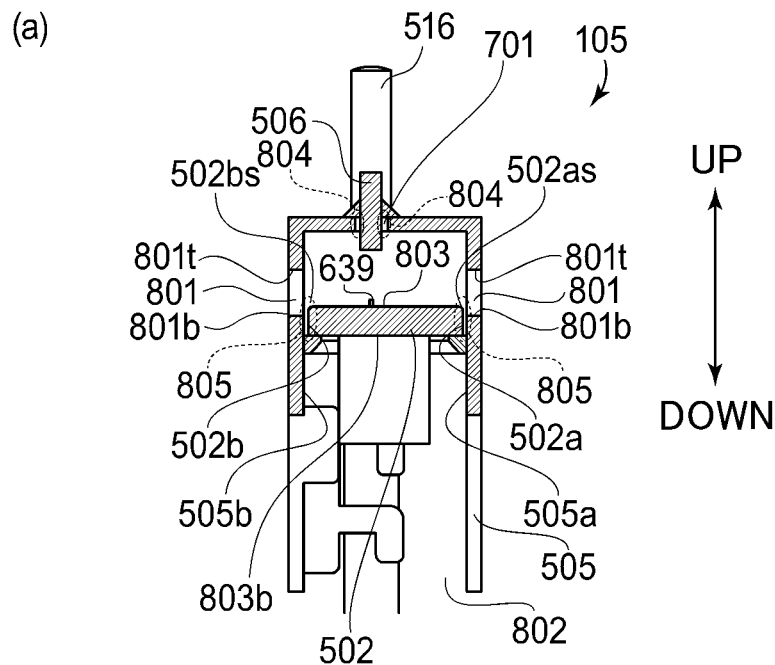
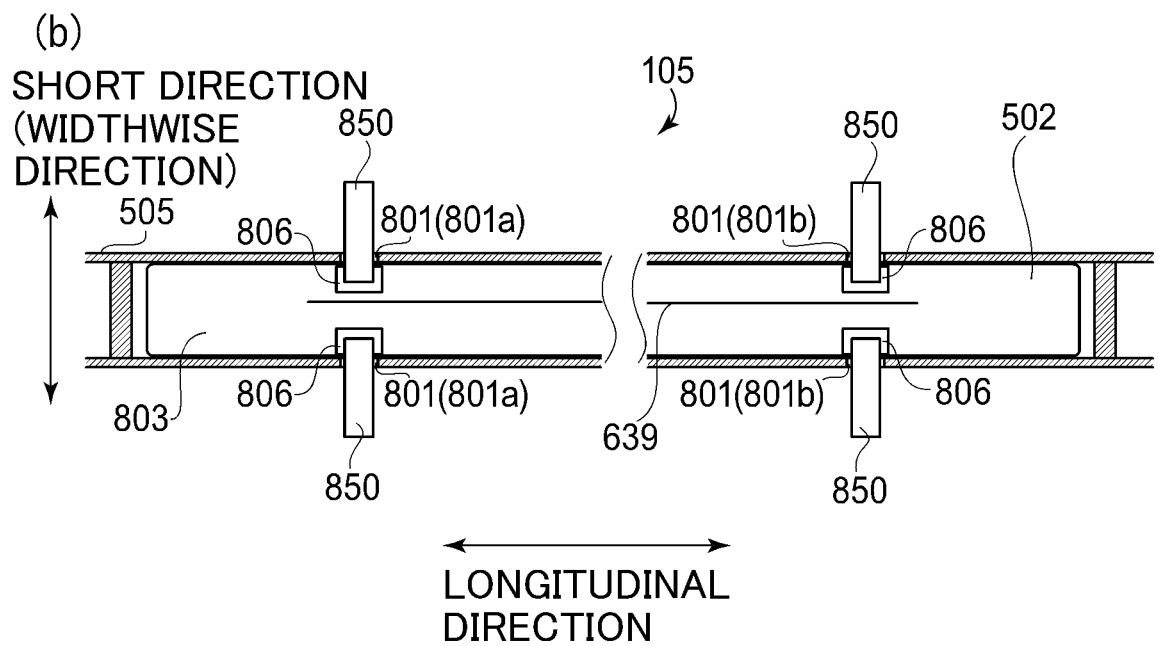
Fig. 6

PROCEDURE 1
```
┌─────────────SUBSTRATE FIXING STEP─────────────┐
│                                               │
│  · POSITIONAL ADJUSTMENT OF SUBSTRATE 502     │
│  · BOND-FIXING OF SUBSTRATE 502 TO HOLDING    │
│    MEMBER 505                                 │
└───────────────────────────────────────────────┘
```

PROCEDURE 2
```
┌─────────────SUBSTRATE SEALING STEP────────────┐
│                                               │
│  · SEALING GAP BETWEEN HOLDING MEMBER 505     │
│    AND SUBSTRATE 502                          │
└───────────────────────────────────────────────┘
```

PROCEDURE 3
```
┌─────────────SHEET STICKING STEP───────────────┐
│                                               │
│  · SEALING INSERTING HOLE 801 BY STICKING     │
│    SEALING MEMBER 800 TO INSERTING HOLE 801   │
└───────────────────────────────────────────────┘
```

PROCEDURE 4
```
┌─────────────LENS ARRAY FIXING STEP────────────┐
│                                               │
│  · POSITIONAL ADJUSTMENT OF LENS ARRAY 506    │
│  · BOND-FIXING OF LENS ARRAY 506 TO HOLDING   │
│    MEMBER 505                                 │
└───────────────────────────────────────────────┘
```
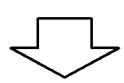

PROCEDURE 5
```
┌─────────────LENS SEALING STEP─────────────────┐
│                                               │
│  · SEALING GAP BETWEEN HOLDING MEMBER 505     │
│    AND LENS ARRAY 506                         │
└───────────────────────────────────────────────┘
```

Fig. 9

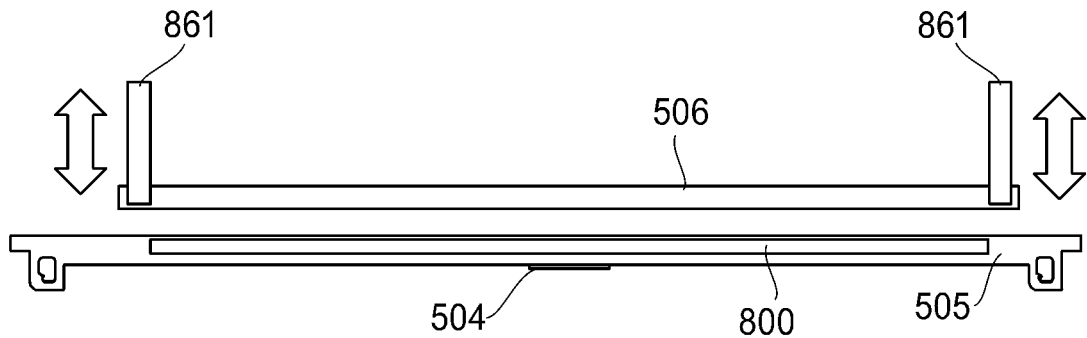
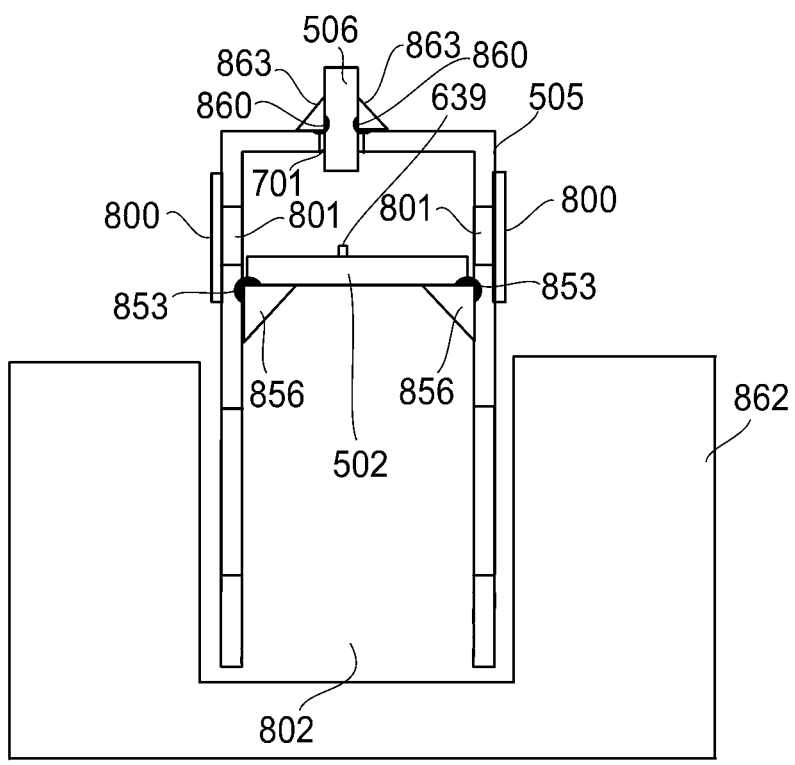
Fig. 15

OPTICAL PRINT HEAD, IMAGE FORMING APPARATUS INCLUDING THE OPTICAL PRINT HEAD, AND MANUFACTURING METHOD OF THE OPTICAL PRINT HEAD

TECHNICAL FIELD

The present invention relates to an optical print head, an image forming apparatus including the optical print head, and a manufacturing method of the optical print head.

BACKGROUND ART

In image forming apparatuses such as a printer and a copying machine, there is an image forming apparatus provided with a plurality of light emitting elements (for example, LEDs (light emitting diodes)) for exposing a photosensitive drum to light. An optical print head in which a plurality of light emitting elements are arranged along a rotational axis direction of the photosensitive member, for example, in a single row (line) or in two rows (lines) with a staggered pattern has been known. Further, the optical print head includes a plurality of lens arrays for focusing light (beams), emitted from the plurality of light emitting elements, onto the photosensitive member. The lens arrays are disposed opposed to the surface of the photosensitive member so as to extend along an arrangement direction of the light emitting elements between the plurality of light emitting elements and the photosensitive member. The light beams emitted from the plurality of light emitting elements are focused onto the photosensitive member surface via the lens arrays. By this, an electrostatic latent image is formed on the photosensitive member.

In order to obtain a good image in the image forming apparatus, there is a need that positioning is carried out so that a distance from the lens array to the photosensitive member surface and a distance from the light emitting element to the lens array are equal to each other. For example, in Japanese Patent No. 5433541, a method of adjusting the distance from the lens array to the photosensitive member surface and the distance from the lens array to the light emitting element is described. FIG. 16 is a view for illustrating a conventional adjusting method. A lens array 962 is inserted into an opening 961d of a casing 961. A positional adjustment of the lens array 962 is carried out so that a distance from the lens array 962 to a photosensitive drum 923 becomes a predetermined distance L1. Thereafter, the lens array 962 is bonded to the casing 961. Then, a base 967 holding an LED substrate 966 on which an LED array chip 965 is mounted is inserted from an upper portion of the casing 961, and adjustment of a position and an attitude of the LED substrate 966 is carried out. Specifically, an adjustment is performed so that a distance Lo from the LED array chip 965 to the lens array 962 becomes equal to the distance Li and so that optical axes of the lens array 962 and the LED array chip 965 coincide with each other while maintaining straightness of the LED substrate 966. After these adjustments, an adhesive 981 is injected into a cut-away portion 961b formed on each of opposite side surfaces of the casing 961, so that the base 967 and the casing 961 are bonded to each other. By this, a position of the LED substrate 966 is fixed relative to the casing 961.

SUMMARY OF THE INVENTION

Problem to be Solved by the Invention

However, in the conventional adjusting method, there is a problem cited below. The base 967 holding the LED substrate 966 is inserted into the casing 961 from the upper portion of the casing 961. At this time, the adjustment is performed while a back surface (surface on a side where the LED substrate 966 is not held) of the base 967 is held by a jig. That is, the base 967 positioned on a side opposite from the LED array chip 965 is held while sandwiching the LED substrate 966 therebetween, and thus the adjustment is performed. For this reason, even in the case where the base 967 is adjusted in a flat state, there is a liability that the distance Lo between the LED array chip 965 and the lens array 962 becomes different depending on the position due to a thickness tolerance of the base 967 and a thickness tolerance of the LED substrate 966. As a result of this, there was a liability that a portion where the distance Lo from the LED array chip 965 to the lens array 962 was not equal to the distance Li from the lens array 962 to the photosensitive drum 923.

Means for Solving the Problem

According to an aspect of the present invention, there is provided an optical print head which is an optical print head including an elongated substrate provided with a light emitting element for emitting light for exposing a photosensitive drum thereto, a lens array for focusing the light emitted from the light emitting element onto the photosensitive drum, and a holding member for holding the substrate and the lens array and in which the holding member includes a first side wall portion facing one end of the substrate in a widthwise direction perpendicular to a longitudinal direction of the substrate and a second side wall portion facing the other end of the substrate in the widthwise direction, wherein a part of a surface of the substrate on a side opposite from a surface of the substrate on which the light emitting element is provided and the holding member are fixed by an adhesive, wherein in the first side wall portion, a first opening through which a corner portion of one end of the substrate on a side where the light emitting element is provided is formed, and wherein in the second side wall portion, a second opening through which a corner portion of the other end of the substrate on a side where the light emitting element is provided is formed.

According to another aspect of the present invention, there is provided an optical print head which is an optical print head including an elongated substrate provided with a light emitting element for emitting light for exposing a photosensitive drum thereto, a lens array for focusing the light emitted from the light emitting element onto the photosensitive drum, and a holding member for holding the substrate and the lens array and in which the holding member includes a first side wall portion facing one end of the substrate in a widthwise direction perpendicular to a longitudinal direction of the substrate, wherein a part of a surface of the substrate on a side opposite from a surface of the substrate on which the light emitting element is provided and the holding member are fixed by an adhesive, wherein in the first side wall portion, a first opening through which a corner portion of one end of the substrate on a side where the light emitting element is provided is formed.

According to a further another aspect of the present invention, there is provided an image forming apparatus including a photosensitive drum, the optical print head described in the above-described aspect or the above-described further aspect, a developing means for forming a toner image by developing, with toner, an electrostatic latent image formed on the photosensitive drum by the optical print head, and a transfer means for transferring the toner image on a recording material.

BRIEF DESCRIPTION OF THE DRAWINGS

FIG. 6 includes views each showing a positional relationship of component parts at a periphery of a holding member in the embodiment.

FIG. 9 is a view showing a manufacturing procedure of the optical print head of the embodiment.

FIG. 15 includes a view showing a positional adjustment of a lens array in the embodiment and a view showing a lens sealing step.

EMBODIMENTS FOR CARRYING OUT THE INVENTION

In the following, preferred embodiments for carrying out the present invention will be described while making reference to the attached drawings. However, constituent elements described in this explanation are merely examples, and the present invention is not limited to the embodiments described in this explanation.

Embodiment

[Outer Appearance of Image Forming Apparatus]

Figure 1:
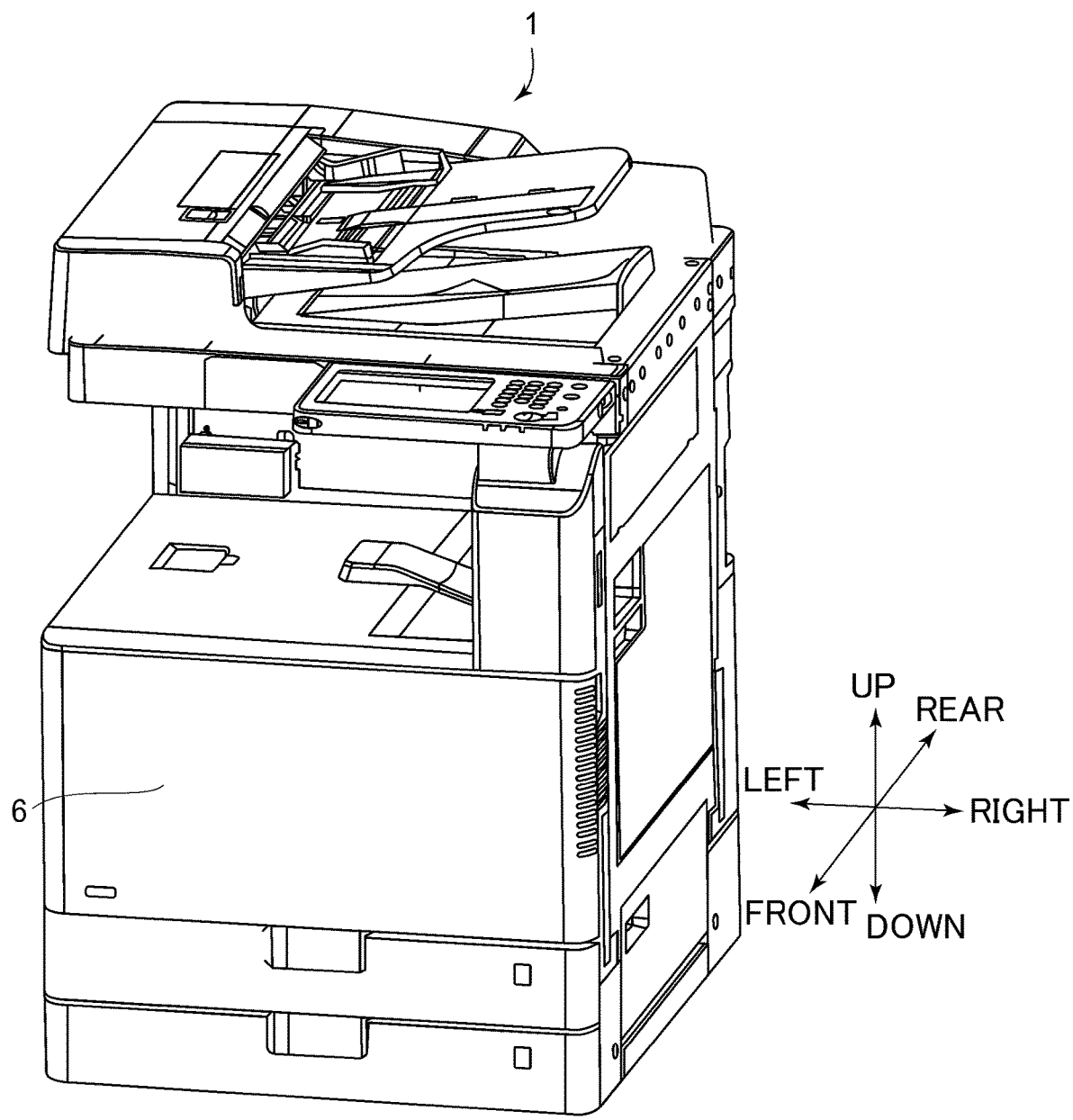
FIG. 1 is a view showing entirety of an image forming apparatus of an embodiment.

FIG. 1 is a perspective view showing entirety of an image forming apparatus 1 of an electrophotographic type of this embodiment. The image forming apparatus 1 shown in FIG. 1 is a multi-function machine (MFP: Multi-Function Printer) provided with a reading device for reading an original. On a front side (predetermined side) of a main assembly of the image forming apparatus 1, an openable/closable front cover 6 is provided. The front cover 6 which is a first door portion is a cover for opening the front side of the image forming apparatus 1 when a cartridge or the like is pulled out to an outside of the image forming apparatus 1. An operator such as a user or a service person performs an operation by opening the front cover 6 in the case where the operator performs a maintenance operation such as a cartridge exchange or the like.

Incidentally, "FRONT", "REAR", "UP", "DOWN", "RIGHT" and "LEFT" of arrows of both directions shown in FIG. 1 indicate directions at the image forming apparatus 1 shown in FIG. 1 used in a subsequent description. The "FRONT" refers to a side where the front cover 6 of the image forming apparatus 1 is mounted and is also referred to as a front surface. The "REAR" refers to a rear side opposite in side from the front cover 6 of the image forming apparatus 1 and is also referred to as a rear surface. Further, the "UP" refers to an upper (up) side of the image forming apparatus 1, and the "DOWN" refers to a lower (down) side. Further, the "RIGHT" refers to a right(-hand) side when the image forming apparatus 1 is viewed from the front cover 6 side, and the "LEFT" refers to a left(-hand) side when the image forming apparatus 1 is viewed from the front cover 6 side.

[Structure of Image Forming Apparatus]

Figure 2:
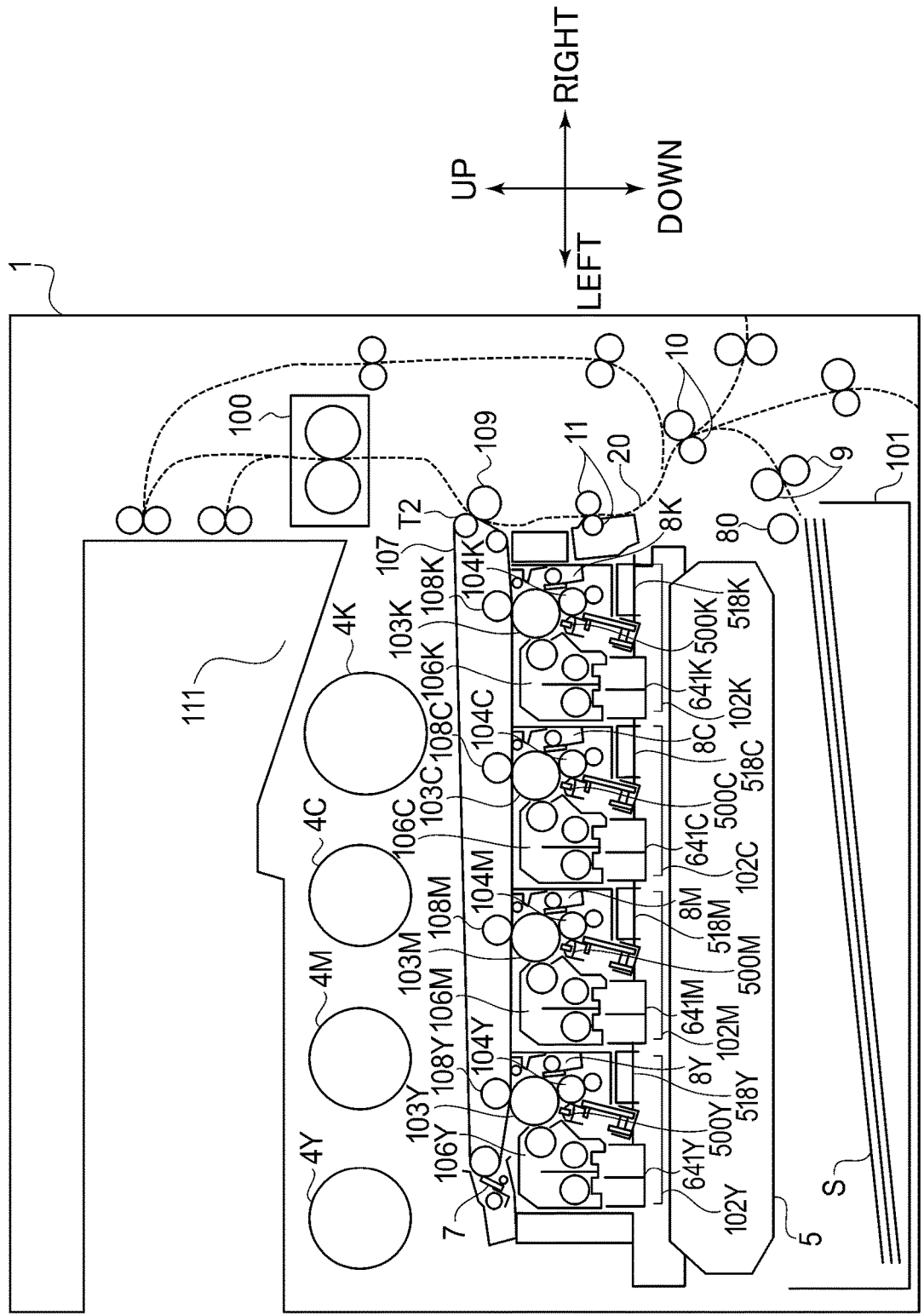
FIG. 2 is a sectional view showing a structure of the image forming apparatus of the embodiment.

Next, a schematic structure of an image forming apparatus 1 will be described. FIG. 2 is a schematic sectional view of the image forming apparatus 1 when the image forming apparatus 1 is viewed from the font cover 6 side. The image forming apparatus 1 to which the present invention is the is multi-function machine provided with the reading device but may also be a printer provided with no reading device. Further, the image forming apparatus 1 is not limited to a so-called tandem type color image forming apparatus including a plurality of photosensitive drums which are photosensitive members as shown in FIG. 2 but may also be an image forming apparatus, including a single photosensitive drum, for forming a monochromatic image.

As shown in FIG. 2, the image forming apparatus 1 includes four image forming portions 102Y, 102M, 102C and 102K (a plurality of image forming portions) for forming toner images of yellow (Y), magenta (M), cyan (C) and black (K), respectively. The respective image forming portions 102Y, 102M, 102C and 102K have the same constitution, and in the following, except for the case where a reference numeral or symbol refers to a specific image forming portion or a member constituting the specific image forming portion, description of Y, M, C and K which are suffixes of reference numerals or symbols showing the colors of the toners will be omitted. Incidentally, the image forming portion 102 is also called a station in some cases. The image forming portion 102 includes the photosensitive drum 103 and a charger 104 for electrically changing the photosensitive drum 103. Further, each of the image forming portions 102 includes an exposure unit 500 using an LED (Light Emitting Diode) as an exposure light source for emitting light with which the photosensitive drum 103 is exposed. As shown in FIG. 2, the image forming apparatus 1 is an image forming apparatus of a so-called "lower surface exposure type" in which the photosensitive drum 103 is exposed to light from below. Thus, in this embodiment, description will be made as to the image forming apparatus of the lower surface exposure type, but the image forming apparatus in which the exposure unit 500 is mounted may also be an image forming apparatus of an "upper surface exposure type" in which the photosensitive drum 3 is exposed to light from above. The photosensitive drum 103 is exposed to light by the exposure unit 500, whereby an electrostatic latent image (latent image) is formed on the photosensitive drum 103. Further, the image forming portion 102 includes a developing device 106 which is a developing means for developing the electrostatic latent image by depositing the toner on the electrostatic latent image formed on the photosensitive drum 103 and for thus forming a toner image of each color on the photosensitive drum 103.

The image forming apparatus 1 includes an intermediary transfer belt 107 onto which the toner images formed on the respective photosensitive drums 103 are transferred and primary transfer rollers 108 provided opposed to the photosensitive drums 103 and for transferring the toner images, formed on the photosensitive drums 103, onto the intermediary transfer belt 107. Further, the image forming apparatus 1 includes a secondary transfer roller 109 (transfer means) for transferring the toner images, on the intermediary transfer belt 107, onto a recording material S fed from a sheet (paper) feeding portion 101 and includes a fixing device 100 for fixing unfixed toner images, transferred on the recording material S, on the recording material S.

The toner remaining on the surface of the photosensitive drum 103 after being transferred onto the intermediary transfer belt 107 is removed by a drum cleaning device 8, and the removed toner is accumulated in a collected toner container 5. Further, the toner remaining on the surface of the intermediary transfer belt 107 after being transferred onto the recording material S is removed by the belt cleaning device 7, and the removed toner is accumulated in the collected toner container 5.

[Outline of Image Forming Process]

Subsequently, an image forming process in the image forming apparatus 1 will be described. In the image forming apparatus 1, in the case where image formation is carried out, first, by the charger 104, the surface of the photosensitive drum 103 is electrically charged to a uniform potential. Then, the exposure unit 500 exposes the surface of the photosensitive drum 103 to light depending on image data, whereby an electrostatic latent image is formed on the photosensitive drum 103. Then, on the electrostatic latent image on the photosensitive drum 103, the toner is deposited by the developer 106, whereby the toner image is formed. The toner images formed on the photosensitive drums 103 of the respective image forming portions 102 are successively transferred superposedly onto the intermediary transfer belt 107 by the primary transfer rollers 108, so that a color toner image is formed.

The recording materials S are stacked in the sheet feeding portion 101 and are fed toward a feeding passage 20 in conformity to an image forming timing. A feeding method of the recording materials S is such that first, a leading end of the recording material S is picked up by a sheet (paper) feeding roller 80, and a single recording material S is fed to the feeding passage 20 by a feeding roller pair 9 for sheet separation in order to prevent double feeding of the recording material S. Thereafter, the recording material S pulled out by a feeding roller pair 10 passes through the feeding passage 20 and is fed to a registration roller pair (hereinafter, referred to as the registration roller pair) 11 and is once stopped. Then, at the registration roller pair 11, after oblique movement correction and timing correction of the recording material S are performed, the recording material S is fed toward a secondary transfer portion T2.

The color toner image superposedly transferred on the intermediary transfer belt 107 is fed to the secondary transfer portion T2 where the recording material S is nipped by the intermediary transfer belt 107 and the secondary transfer roller 109. A transfer voltage is applied to the secondary transfer roller 109, whereby the toner image on the intermediary transfer belt 107 is transferred onto the recording material S fed from the sheet feeding portion 101. The recording material S on which the toner image is transferred in the secondary transfer portion T2 is fed to the fixing device 100, and the fixing device 100 fixes the toner image on the recording material S by heating and pressing the unfixed toner image on the recording material S. Then, the recording material S subjected to a fixing process of the toner image by the fixing device 100 is discharged onto a discharge portion 111.

Further, as shown in FIG. 2, the image forming apparatus 1 includes toner containers 4 corresponding to the respective image forming portions 102. By carrying out the image formation, when an amount of the toner in each of developing units 641 described later decreases, the toner is supplied to each developing unit 641 via a pipe (not shown) from the corresponding toner container 4 of each image forming portion 102. That is, in the developing unit 641 provided in the image forming apparatus 1 of this embodiment, new (fresh) toner is supplied from the toner container, and a part of excessive toner is fed as residual toner toward the collected toner container 5.

[Drum Unit and Developing Unit]

In the image forming portion 102 of the image forming apparatus 1 shown in FIG. 2, drum units 518 which are exchangeable units are mounted. The drum unit 518 includes the photosensitive drum 103 rotatable relative to a frame of the drum unit 518. The drum unit 518 is a cartridge to be exchanged by an operator such as a user or a service person.

Further, in the image forming portion 102 of the image forming apparatus 1 shown in FIG. 2, developing units 641 which are separate and exchangeable members from the drum units 518 is mounted. The developing unit 641 is a cartridge prepared by integrally assembling the developing device 106 and a toner accommodating portion into a unit. The developing device 106 includes a developing sleeve which is a developer carrying member for carrying the toner (developer). The developing unit 641 is provided with a plurality of gears for rotating a screw for stirring the toner and the carrier, and when these gears are aging-deteriorated or the like, the service person dismounts the developing unit 641 from the main assembly of the image forming apparatus 1 and exchanges the developing unit 641 with new one. Further, from the developing unit 641, the toner in a certain amount is removed as residual toner, and the removed toner is fed toward the collected toner container 5. Incidentally, the above-described drum unit 518 and the above-described developing unit 641 may also be a process cartridge prepared by integrally assembling the drum unit 518 and the developing unit 641 into a unit.

[Structure of Optical Print Head]

Figure 3:
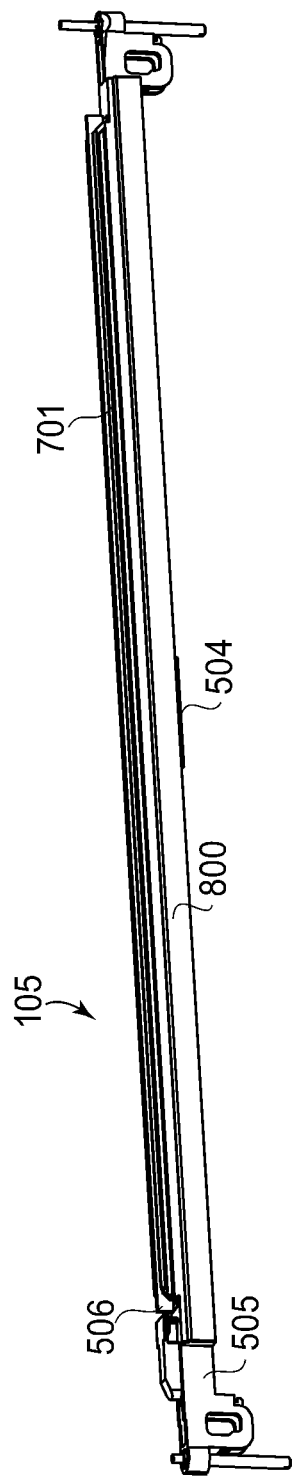
FIG. 3 is a perspective view showing an optical print head of the embodiment.
Figure 4:
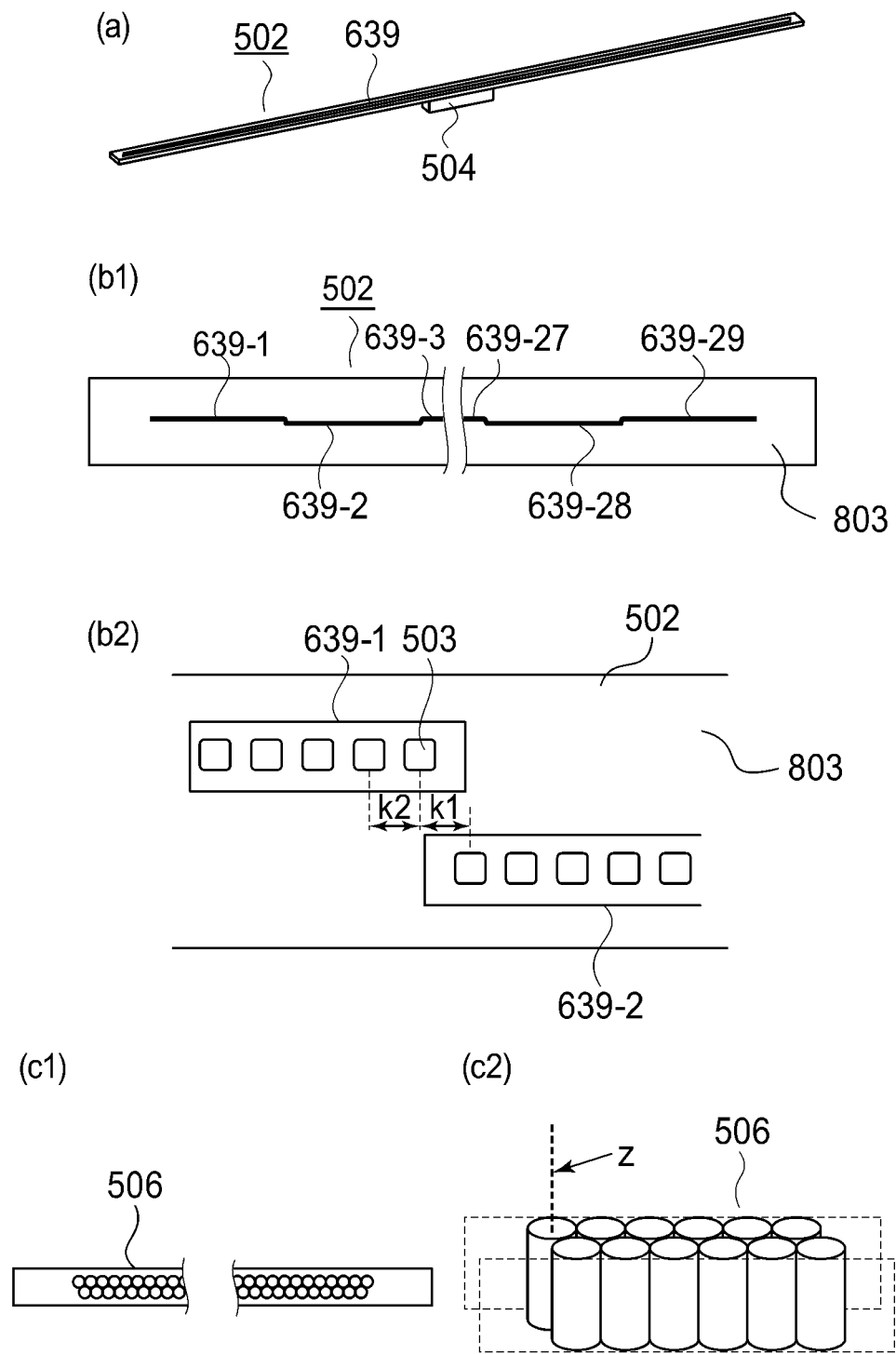
FIG. 4 includes views each showing a structure of the optical print head of the embodiment.

Next, an optical print head 105 (an example of an LED print head) provided in the exposure unit 500 will be described, using FIGS. 3 and 4. FIG. 3 is a view showing the optical print head 105. FIG. 4 includes views showing a schematic structure of the optical print head 105 provided in the image forming apparatus 1 of this embodiment. In the exposure type used in an image forming apparatus of an electrophotographic type, there is a laser beam scanning exposure type in which a beam (light) emitted from a semiconductor laser is deflected by a rotating polygon mirror and the photosensitive drum is exposed to the beam through f-θ lens or the like. The "optical print head 105" described in this embodiment uses an LED exposure type in which the photosensitive drum 103 is exposed to light by using light emitting elements such as LEDs or the like arranged along the rotational axis direction of the photosensitive drum 103, and this exposure type is an exposure type different from the laser beam scanning exposure type described above.

As described above, the exposure unit 500 in this embodiment is an exposure unit for exposing the photosensitive drum 103 from a lower (down) direction. For that reason, the optical print head 105 is provided on a side below a rotational axis of the photosensitive drum 103 with respect to an up-down direction, and the surface of the photosensitive drum 103 is exposed to light from the lower direction by LEDs 503 of the optical print head 105. As shown in FIG. 3, the optical print head 105 includes a lens array 506 (an example of a lens), a lens mounting portion 701 on which the lens array 506 is mounted and a holding member 505 for holding a substrate 502 (see FIG. 4) on which the LEDs 503 are mounted. Thus, the optical print head 105 is constituted by at least three members of the lens array 506, the substrate 502, and the holding member 505 for holding the lens array 506 and the substrate 502. The lens mounting portion 701 includes an inserting opening for permitting insertion of the lens array 506. Further, the optical print head 105 includes a sheet member 800. The holding member 505 may be formed of metal and may also be formed of a resin (material). In this embodiment, the holding member 505 is a thin plate made of iron, and is processed in a U-character shape by for example, press processing. The substrate 502 is provided with an FFC connector 504. The sheet member 800 will be described later.

Next, an elongated substrate 502 held by the holding member 505 will be described. Incidentally, a direction of a long side of the substrate 502 is referred to as a longitudinal direction, and a direction perpendicular to the longitudinal direction is referred to as a short direction (or a widthwise direction). Here, the "widthwise direction" is a direction perpendicular to both of the longitudinal direction of the substrate 502 and the optical axis direction of the lens of the lens array 506 in a state in which the substrate 502 is held by the holding member 505. However, the "perpendicular" mentioned herein is not "perpendicular" in a strict mathematical sense, but is a concept including "perpendicular" to the extent that the state can be practically regarded as the "perpendicular", i.e., including "substantially perpendicular". Part (a) of FIG. 4 is a schematic perspective view showing a shape of the substrate 502. Part (b1) of FIG. 4 shows an arrangement of LED chips 639 provided in plurality on the substrate 502. Part (b2) of FIG. 4 is an enlarged view of part (b1) of FIG. 4. On the substrate 502, the LED chips 639 including a plurality of LEDs 503 are mounted. As shown in part (a) of FIG. 4, on one surface (hereinafter, referred to as a mounting surface) 803 of the substrate 502, the LED chips 639 are mounted, and on the other surface of the substrate 502 (i.e., on the surface opposite from a side where the LEDs 503 are arranged) an elongated FFC connector 504 is provided. The FFC connector 504 is mounted on a lower surface of the substrate 502 so that a longitudinal direction thereof extends along a longitudinal direction of the substrate 502.

On the substrate 502, electrical wiring for supplying signals from the FFC connector 504 to the respective LED chips 639. To the FFC connector 504, one end of an FFC (not shown) as an example of a cable is connected.

In the image forming apparatus 1 main assembly, a substrate including a controller for controlling the image forming apparatus 1 and a connector is provided. The other end of the FFC is connected to the connector provided on the substrate 502, and electrically connects between the controller and the substrate 502. To the substrate 502, a control signal (driving signal) outputted from the controller of the image forming apparatus 1 main assembly is inputted through the FFC and the FFC connector 504. Further, the LED chips 639 mounted on the substrate 502 are driven by the inputted control signal.

The LED chips 639 mounted on the substrate 502 will be described further specifically. As shown in parts (b1) and (b2) of FIG. 4, on the mounting surface 803 of the substrate 502, for example, 29 LED chips 639-1 to 639-29 including a plurality of LEDs 503 are disposed. Inside each of the LED chips 639, 516 LEDs 503 are arranged in a line along a longitudinal direction. With respect to the longitudinal direction of the inside of the LED chips 639, a center distance k2 between adjacent LEDs 503 corresponds to resolution of the image forming apparatus 1. The resolution of the image forming apparatus 1 is, for example, 1200 dpi, and therefore, in the longitudinal direction of the inside of the LED chips 639, the LEDs 503 are arranged in a line so that the center distance k2 from the adjacent LED 503 is 21.16 µm. As a result, an exposure range of the optical print head 105 in this embodiment is about 316 mm (≈21.16 µm×516 pieces×29 pieces). On the other hand, a photosensitive layer on the surface of the photosensitive drum 103 exposed to light by the optical print head 105 is formed with a width of 316 mm or more. A long-side length of A4-size recording paper and a short-side length of A3-size recording paper are 297 mm, and therefore, the optical print head 105 in this embodiment has an exposure range in which the image can be formed on the A4-size recording paper and the A3-size recording paper.

The LED chips 639-1 to 639-29 are alternately disposed in two (parallel) lines along the rotational axis direction. That is, as shown in part (b1) of FIG. 4, in the figure, odd-numbered LED chips 639-1, 639-3, . . . 639-29 counted from a left side are mounted on the substrate 502 in a line with respect to the longitudinal direction. Further, in the figure, even-numbered LED chips 639-2, 639-4, . . . 639-28 counted from the left side are also mounted on the substrate 502 in a line with respect to the longitudinal direction. That is, the odd-numbered LED chips 639-1, 639-3, . . . 639-29 and the even-numbered LED chips 639-2, 639-4, . . . 639-28 are disposed (disposed in a staggered arrangement) with predetermined intervals in the widthwise direction. By disposing the LED chips 639 in such a manner, in the longitudinal direction of the LED chips 639, the center distance k2 between the LEDs 503 disposed at end portions of mutually adjacent LED chips 639 and a center distance k1 between adjacent LEDs 503 in the LED chip 639 can be made equal to each other. Incidentally, in this embodiment, a constitution using the LEDs 503 as the light source is shown, but the light source is not limited to the LEDs. For example, the light source may also be an OLED (Organic Light Emitting Diode). This OLED is also called an organic EL (Organic Electro-Luminescence), and is an light emitting element of a current-drive type. The OLEDs are disposed on, for example, a TFT (Thin Film Transistor) in a line along a main scan direction (a rotational axis direction of the photosensitive drum 103), and are electrically connected in parallel by a power source wiring provided similarly along the main scan direction.

Next, the lens array 506 will be described. Part (c1) of FIG. 4 is a schematic view showing a structure when the lens array 506 mounted on the optical print head 105 is viewed from the photosensitive drum 103 side. Further, part (c2) of FIG. 4 is a perspective view (schematic view) showing a schematic structure of the lens array 506. As shown in part (c1) of FIG. 4, the respective lenses of the lens array 506 are arranged in two lines along an arrangement direction of the of LEDs 503 in the corresponding LED chip 639. The respective lenses in the lens array 506 are alternately disposed so that each lens contacts an adjacent lens on the same line and further contacts at least one lens in the other line. In this embodiment, each of the lenses in the lens array 506 is a cylindrical rod lens made of glass, but, a material of the lens is not limited to glass but may also be plastics, and also shapes of the lenses are not limited to the cylindrical shape but may also be, for example, a polygonal prism (shape) such as a hexagonal prism (shape).

Further, a dotted line Z shown in part (c2) of FIG. 4 represents an optical axis of the lens of the lens array 506. The optical print head 105 is movable by the moving mechanism (not shown) in a direction (up-down direction) roughly along the optical axis of the lens indicated by the dotted line Z. The "optical axis of the lens" referred to herein means a line connecting a center of a light emergent surface of the lens and a focus of the lens. Emitted light emitted from the LED 503 enters the lens of the lens array 506, and a direction of the optical axis is also referred to as a focus direction in the following. The beam light emitted from the LED 503 enters the lens of the lens array 506. The lens of the lens array 506 has a function of focusing the beam light entering the lens on the surface of the photosensitive drum 103. For that reason, a mounting position of the lens array 506 relative to a lens mounting portion 701 (see FIG. 3) is adjusted during assembling of the optical print head 105 so as to become the following position. That his, the mounting position of the lens array 506 is adjusted so that a distance between a light emitting surface of the LED 503 of the LED chip 639 and a light incident surface of the lens of the lens array 506 and a distance between the light emergent surface of the lens of the lens array 506 and the surface of the photosensitive drum 103 are substantially equal to each other.

[Mounting and Dismounting Constitution of Optical Print Head]

Next, a mounting and dismounting mechanism for the optical print head 105 relative to the photosensitive drum 103 will be described. The optical print head 105 is capable of being pulled out from a front side of the image forming apparatus 1 to an outside of the image forming apparatus 1. As described above, the optical print head 105 is disposed close to the photosensitive drum 103 and has a function of exposing the photosensitive drum 103 to light. A position where the optical print head 105 is disposed close to the photosensitive drum 103 and is disposed in a state in which the electrostatic latent image is capable of being formed on the photosensitive drum 103 is hereinafter referred to as an exposure position. Further, a position where the optical print head 105 is in a state in which the optical print head 105 is capable of being taken out to the outside of the image forming apparatus 1 is hereinafter referred to as a retracted position. During taking-out of a drum unit 518 from the image forming apparatus 1 main assembly, when the optical print head 105 remains at a place of the exposure position, the following problem arises. That is, there is a liability that the optical print head 105 prevents a taking-out operation when the drum unit 518 is taken out. For this reason, the optical print head 105 in this embodiment has a mounting and dismounting function (not shown) so that the optical print head 105 is in a place (exposure position) where the optical print head 105 is brought close to the photosensitive drum 103 during the exposure but is moved to the retracted position during maintenance of the image forming apparatus 1.

[Detailed Constitution of Optical Print Head]

Figure 5:
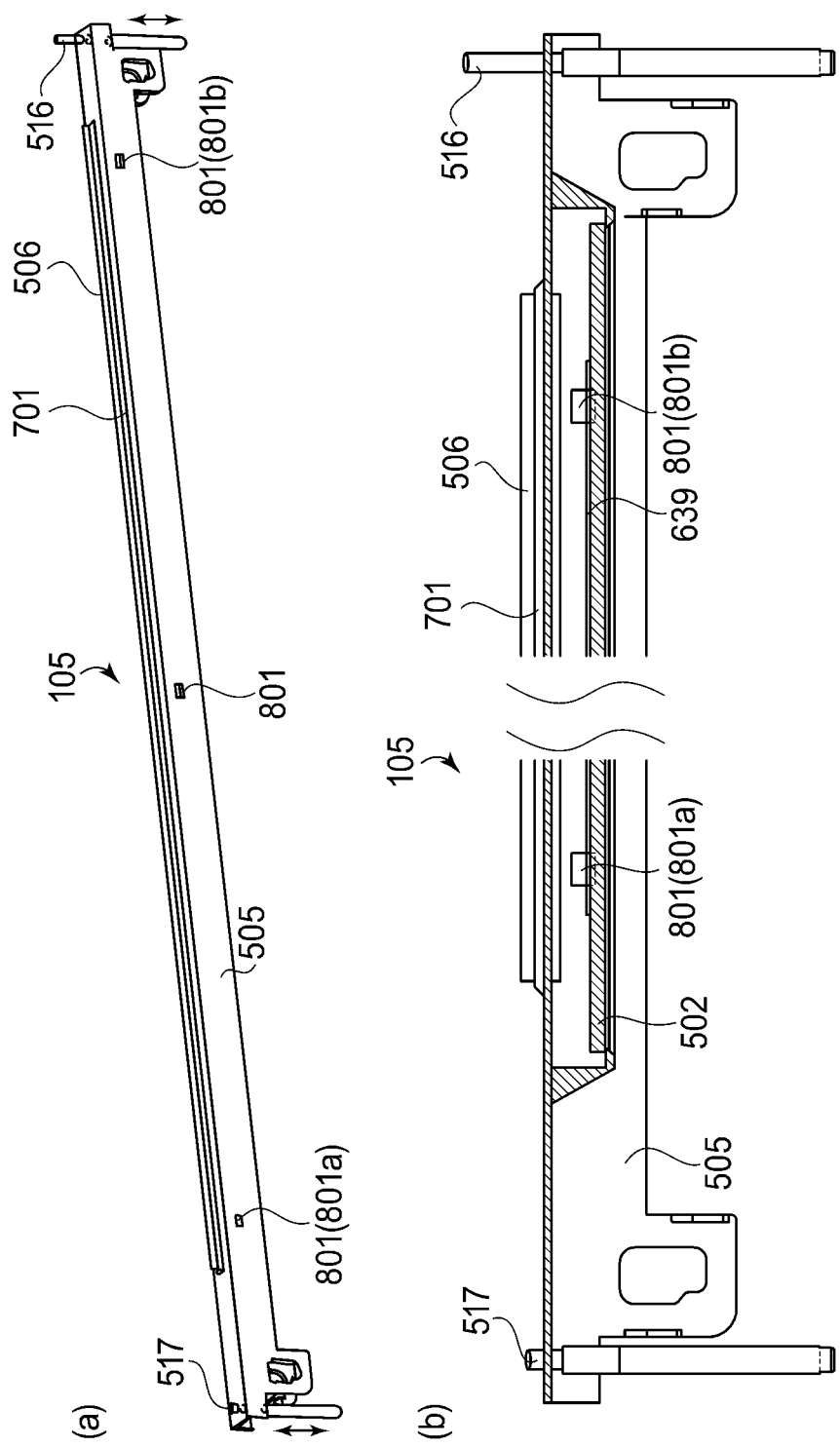
FIG. 5 includes a view showing a state in which a sheet member is peeled off from a holding member in the embodiment, and a sectional view of the optical print head.

Next, a detailed constitution of the optical print head 105 will be described. Part (a) of FIG. 5 is a perspective view of the optical print head 105 showing a state in which the sheet member 800 is peeled off from the optical print head 105 of FIG. 3. On both side surfaces of the holding member 505, inserting holes 801 which are a first opening and a second opening for permitting insertion of jig pins 850 (not shown in part (a) of FIG. 5) for positioning the substrate 502 with respect to the focus direction are formed at three positions or more (formed in a plurality of portions) with respect to the longitudinal direction of the holding member 505. Incidentally, the inserting holes 801 may only be required to be provided in plurality in each of both side surfaces of the holding member 505, and in this embodiment, are provided at three portions in total including both end portions and a central portion of the holding member 505 with respect to the longitudinal direction. Preferably, the inserting holes 801 may desirably be formed at least on one end side and on the other end side of the member 505 with respect to the longitudinal direction of the holding member 505. Although described later specifically, by forming the inserting holes 801 at least on one end side and on the other end side of the holding member 505 with respect to the longitudinal direction, the substrate 502 can be supported by jig pins (described later) on both end sides with respect to the longitudinal direction of the substrate 502. By this, it becomes possible to stably support the substrate 502.

The sheet member 800 has a role such that positioning and fixing of the substrate 502 to the holding member 505 are performed and thereafter the inserting holes 801 are closed for protection against dust. A front pin end 516 and a rear pin end 517 are pins for fixing a position of the holding member 505 to various jigs by being abutted against bearing surfaces of the various jigs in a manufacturing step of the optical print head 105. The front pin end 516 and the rear pin end 517 are capable of moving in a direction (up-down direction focus direction) perpendicular to the short direction and the longitudinal direction (up-down double-pointed arrow in part (a) of FIG. 5).

Part (b) of FIG. 5 is a sectional view of the optical print head 105 showing a state in which the sheet member 800 is peeled off from the optical print head 105 of FIG. 3. In the case where the optical print head 105 is viewed from a side surface thereof, the inserting holes 801a and 801b positioned at both ends of the holding member 505 with respect to the longitudinal direction are disposed at overlapping positions with the LED chips 639-1 and 639-29 of the LED chips 639 at both ends on the substrate 502. This is because the following procedure is needed for accurately carrying out positioning, with respect to the focus direction, of all the LED chips 639-1 to 69-29 mounted on the substrate 502. That is, there is a need that the neighborhoods of the LED chips 639-1 and 639-29 positioned at both ends at least in the longitudinal direction of the substrate 502 are abutted against the jig pins 850.

Part (a) of FIG. 6 is a sectional view of the optical print head 105 in the inserting holes 801, showing a positional relationship between component parts around the holding member 505. The holding member 505 includes a first side wall portion 505a facing one end 502a of the substrate 502 with respect to the widthwise direction and a second side wall portion 505b facing the other end 502b of the substrate 502 with respect to the widthwise direction. As shown in part (a) of FIG. 6, a part of the one end 502a of the substrate 502 and the first side wall portion 505a oppose each other. Further, a part of the other end 502b of the substrate 502 with respect to the widthwise direction and the second side wall portion 505b also oppose each other. Of the substrate 502, a part of a surface 803b on a side opposite from the mounting surface 803 where the LED chips 639 are provided, and the holding member 505 are fixed to each other by an adhesive described later. For that reason, into a gap between the one end 502a of the substrate 502 and the first side wall portion 505a, a part of an adhesive flows in some instances. In this case, the adhesive exists between the one end 502a of the substrate 502 and the first side wall portion 505a. Meaning of "oppose" referred to in this embodiment is a concept including the case where thus another member exists between the one end 502a of the substrate 502 and the first side wall portion 505a. Similarly, even in the case where the adhesive exists between the other end 502b of the substrate 502 and the second side wall portion 505b, it will be said that the other end 502b of the substrate 502 and the second side wall portion 505b oppose each other. The first side wall portion 505a of the holding member 505 is provided with the inserting hole 801 where a corner portion 502 as, on the mounting surface 803 side, of the other end 502b of the substrate 502 with respect to the widthwise direction is exposed. The second side wall portion 505b of the holding member 505 is provided with the inserting hole 801 where a corner portion 502bs, on the mounting surface 803 side, of the other end 502b of the substrate 502 with respect to the widthwise direction is exposed. Further, as shown in part (a) of FIG. 6, a part of the inserting hole 801 does not oppose the substrate 502. Incidentally, in this embodiment, a constitution in which both the first side wall portion 505a and the second side wall portion 505b are provided with the inserting hole 801 is employed. However, a constitution in which either one of the first side wall portion 505a and the second side wall portion 505b is provided with the inserting hole 801 may also be employed.

Incidentally, the "expose" referred to herein does not mean a state in which the corner portion 502as of the substrate 502 is positioned outside of the holding member 505 from the inserting hole 801. Herein, a state in which the corner portion 502as of the substrate 502 is in a sight when for example, the operator looks into the inserting hole 801, from the outside of the holding member 505 with respect to the widthwise direction, formed in the first side wall portion 502a refers to that the corner portion 502as is exposed from the inserting hole 801. In other words, in the case where the corner portion 502a is positioned above a lower end 801b which is a lower edge of the inserting hole 801 and on a side lower than 801t which is an upper edge of the inserting hole 801, the corner portion 502a can be said that the corner portion 502a is exposed from the inserting hole 801 formed in the first side wall portion 502a. Thus, the corner portion 502as of the substrate 502 and the inserting hole 801 formed in the first side wall portion 502a are in an overlapping positional relationship, so that the corner portion 502as of the substrate is exposed from the inserting hole 801. This definition is also similarly applied to the corner portion 502bs of the substrate.

The holding member 505 is provided with a lens mounting portion 701 for permitting insertion and fixing of the lens array 506 and with an opening 802 for permitting insertion and fixing of the substrate 502. A position of the substrate 502 with respect to the focus direction is determined by the jig pin 850 (see part (b) of FIG. 6), and therefore, the optical print head 105 is not provided with a positioning means for the substrate 502 with respect to the focus direction. Further, the lower end 801b of the inserting hole 801 is positioned below the mounting surface 803 of the substrate 502 for the LED chip 639, and the upper end 801t of the inserting hole 801 is positioned above the mounting surface 803. By providing such a positional relationship, the jig pin 850 is inserted into the inserting hole 801 without interfering with the inserting hole 801, and the jig pin 850 is abutted against the substrate 502, whereby positioning of the substrate 502 with respect to the focus direction is performed. Each of a gap 804 (broken-line circular portion) between the holding member 505 and the lens array 506 and a gap 805 (broken-line circular portion) between the holding member 505 and the substrate 502 is sealed by a sealing agent (adhesive).

Part (a) of FIG. 6 is a sectional view of the optical print head 105, showing a positional relationship when the jig pin 850 is inserted from the inserting hole 801. On the mounting surface 803 of the substrate 502, a resist portion 806 is formed. The resist portion 806 is a portion where the resist portion 806 abuts against the jig pin 850 in an assembling procedure of the optical print head 105. Onto the resist portion 806, a resist for protecting a circuit of the substrate 502 is applied, so that an insulative property is maintained.

Incidentally, the inserting holes 801a and 801b positioned at both ends of the holding member 505 with respect to the longitudinal direction were disposed at overlapping positions with the LED chips 639-1 and 639-29 of the LED chips 639 mounted on the substrate 502. However, in the case where the inserting holes are viewed from the side surface of the optical print head 105, the inserting holes 801a and 801b may also be positioned on the outside of the LED chips 639-1 and 639-29 when the inserting holes 801a and 801b are positioned in the neighborhoods of the LED chips 639-1 and 639-29. Further, in this embodiment, the sheet member 800 is used for closing the inserting hole 801, but the inserting hole 801 may also be closed by an ultraviolet curable resin, a humidity curable resin, or the like, for example.

Figure 7:
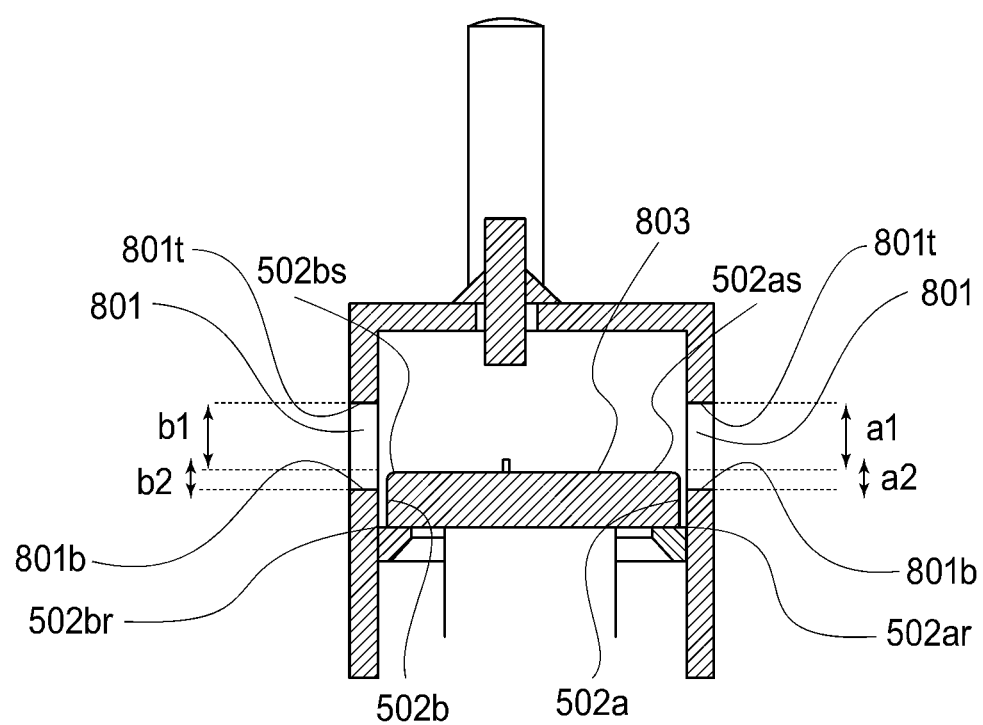
FIG. 7 is a view for illustrating openings formed in the holding member in the embodiment.

Here, the positional relationship between the inserting hole 801 and the substrate 502 will be described further specifically. FIG. 7 is a view for illustrating the positional relationship between the inserting hole 801 and the substrate 502. Incidentally, of reference numerals or symbols added in FIG. 7, those identical to those in part (a) of FIG. 6 have similar functions, and therefore, will be omitted from description. As shown in FIG. 7, of the one end 502a of the substrate 502 with respect to the widthwise direction, the corner portion 502as on the mounting surface 803 side is exposed from the inserting hole 801. On the other hand, of the one end 502a of the substrate 502 with respect to the widthwise direction, a corner portion 502ar on a surface side opposite from the mounting surface 803 is not exposed from the inserting hole 801. Similarly, of the other end 502b of the substrate 502 with respect to the widthwise direction, the corner portion 502bs on the mounting surface 803 side is exposed from the inserting hole 801. On the other hand, a corner portion 502br on a surface side opposite from the mounting surface 803 is not exposed from the inserting hole 801.

Further, as shown in FIG. 7, a length a2 of a portion, of the inserting hole 801 with respect to the optical axis direction, opposing the one end 502a of the substrate 502 is shorter than a length a1 of a portion, of the inserting hole 801 with respect to the optical axis direction, which does not oppose the one end 502a of the substrate 502. Similarly, a length b2 of a portion, of the inserting hole with respect to the optical axis direction, opposing the other end 502b of the substrate 502 is shorter than a length b1 of a portion, of the inserting hole 801 with respect to the optical axis direction, which does not oppose the other end 502b of the substrate 502. Further, a thickness of the substrate 502 in the optical axis direction is smaller than a length a1+a2 (b1+b2) of the inserting hole 801 in the optical axis direction. A diameter of the jig pin described later is smaller than a1 (b1) which is also an interval between the upper end 801t of the inserting hole 801 in the optical axis direction and the mounting surface 803 of the substrate 502, and therefore, the jig pin is capable of easily extracted from and inserted into the inserting hole 801.

Figure 8:
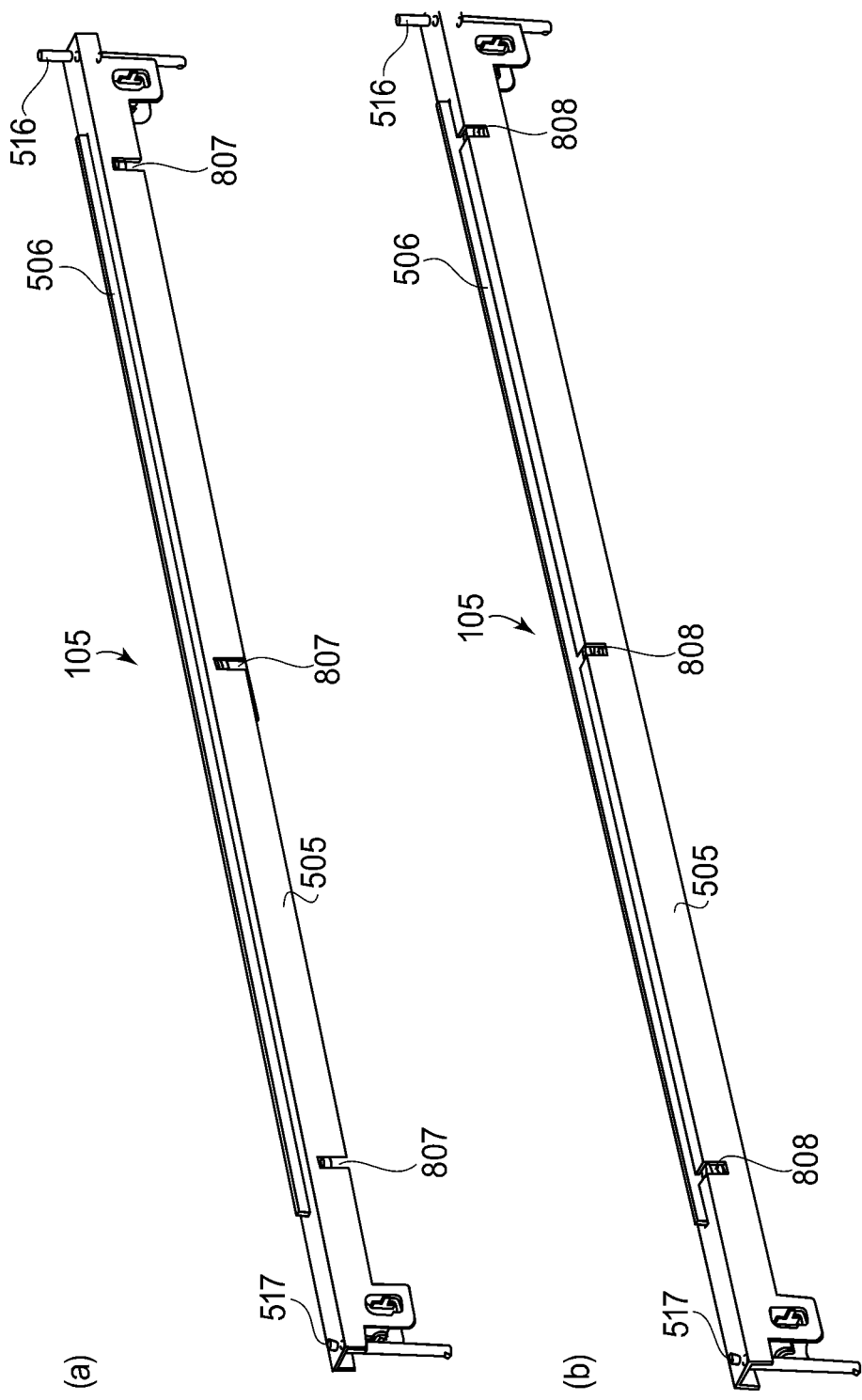
FIG. 8 includes views each showing another example of an inserting hole in the embodiment.

Further, also, the inserting hole 801 is not limited to the above-described form. Part (a) of FIG. 8 is a view showing another example of a portion for permitting insertion of the jig pins 850. As shown in part (a) of FIG. 8, the holding member 505 may also be provided with cut-away portions 807 at three or more positions. Part (b) of FIG. 8 is a view showing another example of the portion for permitting insertion of the jig pins 850. As shown in part (b) of FIG. 8, the holding member 505 may also be provided with three or more openings 808 integrally connected to the lens mounting portion 701.

[Manufacturing Procedure of Optical Print Head]

Next, a manufacturing procedure of the optical print head 105 will be described. The manufacturing procedure is constituted by from a procedure 1 to a procedure 5. The procedure 1 is a substrate fixing step, in which positional adjustment of the substrate 502 relative to the holding member 505 is performed. Further, in the procedure 1, bond adhesive-fixing of the substrate 502 to the holding member 505 is performed. A procedure 2 is a substrate sealing step, in which sealing for filling a gap between the holding member 505 and the substrate 502 is performed.

A procedure 3 is a sheet sticking step, in which the sheet member 800 is sticked to the inserting hole 801 of the holding member 505 and sealing of the inserting hole 801 is performed. A procedure 4 is a lens array fixing step, in which positional adjustment of the lens array 506 relative to the holding member 505 is performed. Further, in the procedure 4, bond-fixing of the lens array 506 to the holding member 505 is performed. The procedure 5 is a lens sealing step, in which sealing for filling the gap between the holding member 505 and the lens array 506 is performed. The respective steps described in FIG. 9 will be described in detail in the following.

(Procedure 1: Substrate Fixing Step)

Figure 10:
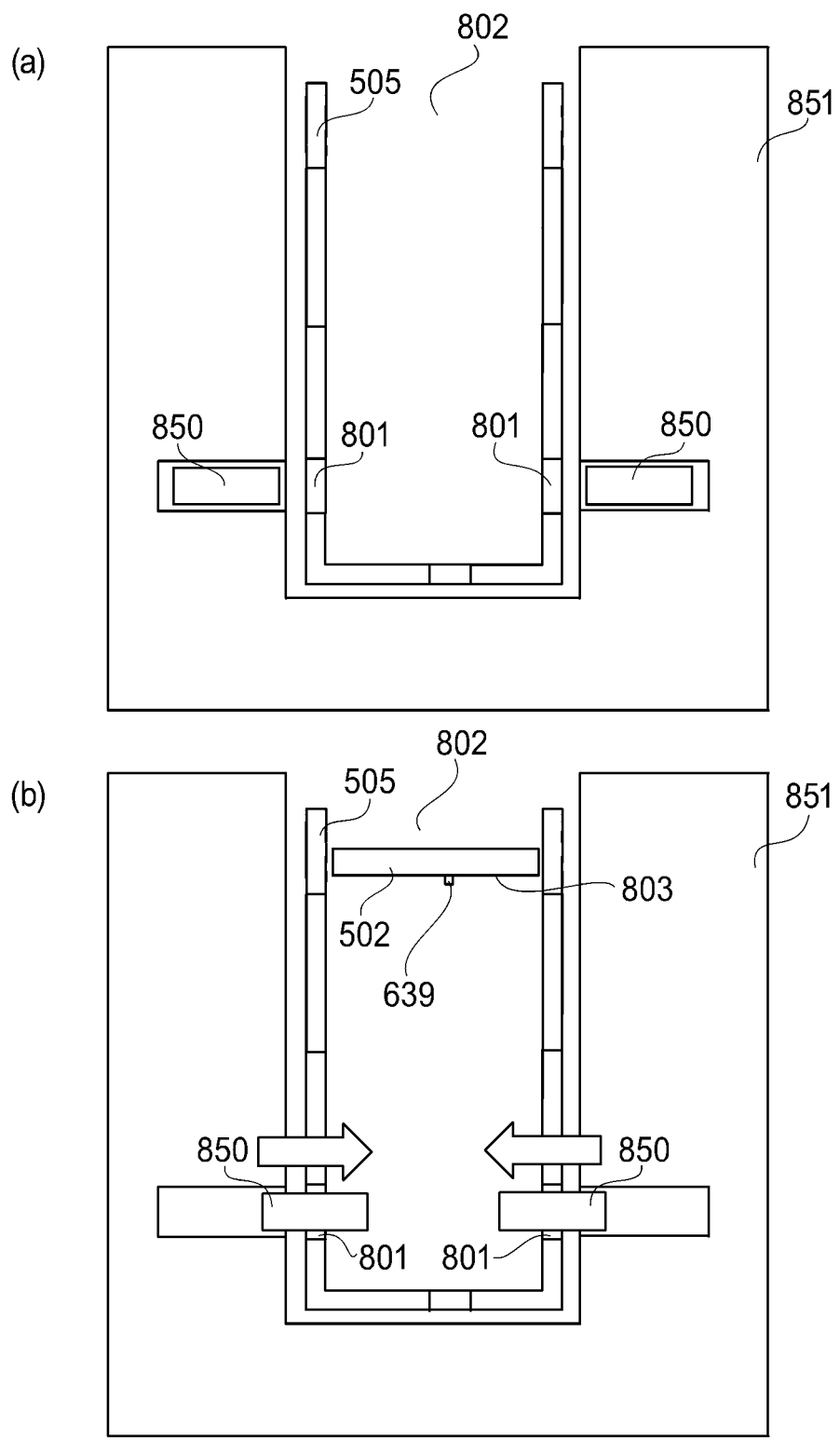
FIG. 10 includes views showing a substrate fixing step in the embodiment.
Figure 12:
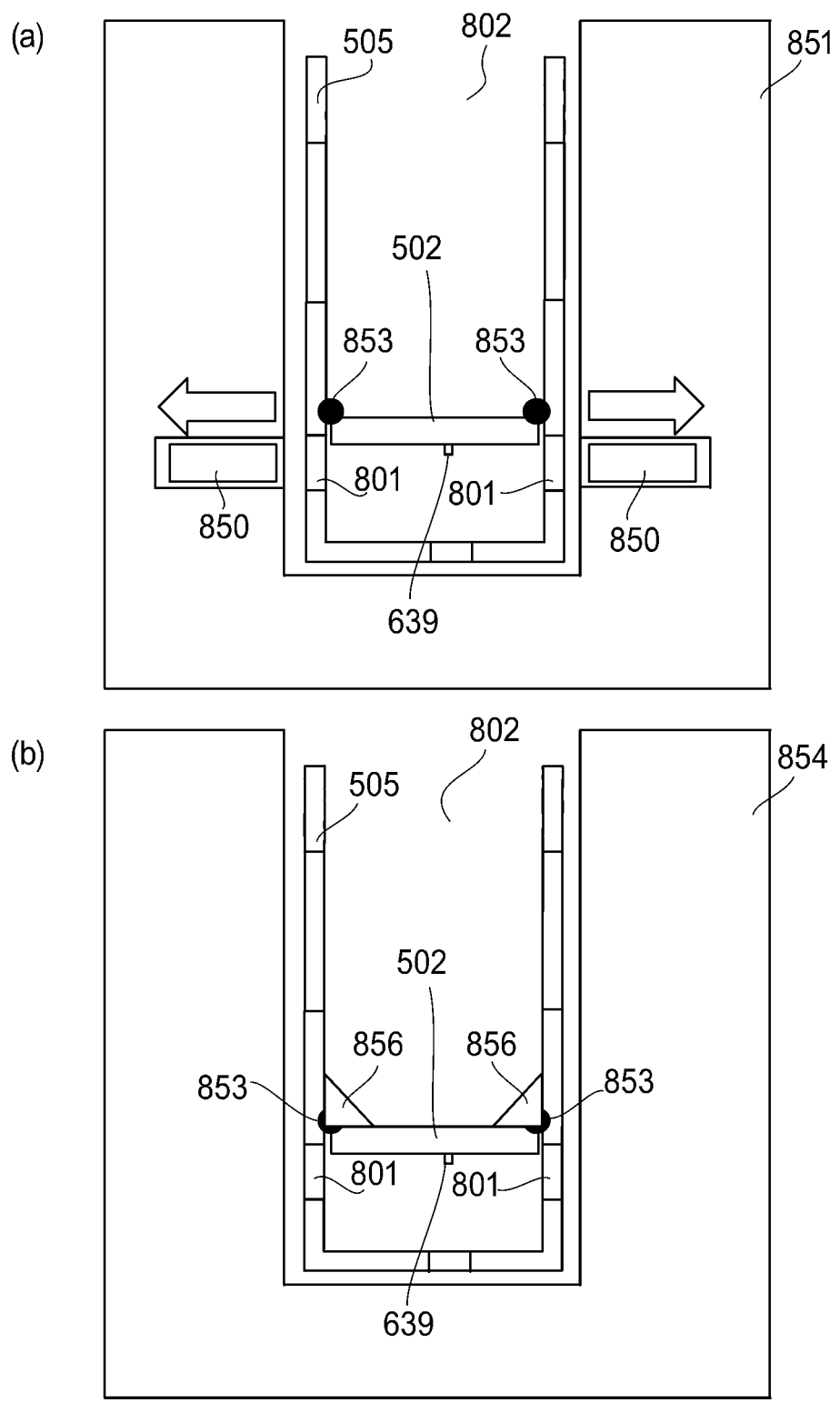
FIG. 12 includes views showing the substrate fixing step and a substrate sealing step in the embodiment.

FIG. 10 to part (a) of FIG. 12 are sectional views showing the substrate fixing step and are the sectional views of the optical print head 105 in the inserting holes 801 with respect to the widthwise direction. As shown in part (a) of FIG. 10, first, the holding member 505 is mounted in a substrate fixing jig 851 in a state in which the opening 802 faces upward. Specifically, the front pin end 516 and the rear pin end 517 of the holding member 505 are abutted against bearing surfaces (not shown) of the substrate fixing jig 851, so that the position of the holding member 505 is fixed.

Next, as shown in part (b) of FIG. 10, the jig pins 850 provided in the substrate fixing jig 851 pass through the inserting holes 801 from both side surfaces of the holding member 505 and move in arrow directions in part (b) of FIG. 10. At this time, the jig pins 850 and edges of the inserting holes 801 are in a non-contact positional relationship. In other words, in a state in which the jig pins 850 are inserted in the inserting holes 801, between the jig pin 850 and the inserting hole 801, a gap is formed. By this, the jig pin 850 is smoothly inserted into and extracted from the inserting hole 801.

The substrate fixing jig 851 includes three or more jig pins 850 on one side, with respect to the longitudinal direction of the substrate 502, at positions where the jig pins 850 are inconformity to the inserting holes 801 of the holding member 505. By this, bearing surfaces for positioning the substrate 502 with respect to the focus direction are formed. That is, two jig pins 850 functions, as one pair, as the bearing surfaces for positioning the substrate 502 by inserting three pairs of jig pins 850 along the longitudinal direction are inserted into corresponding inserting holes 801, respectively.

Next, as shown in part (b) of FIG. 10, the substrate 502 is inserted from the opening 802 of the holding member 505 in a state in which the mounting surface 803 for the LED chip 639 faces downward. Then, as shown in part (a) of FIG. 11, the substrate 502 is abutted against the jig pins 850, and positional adjustment of the substrate 502 with respect to the longitudinal direction and the widthwise direction is also carried out (positional adjustment step). A portion where the substrate 502 contacts the jig pin 850 is only the resist portion 806 described in part (b) of FIG. 6, so that the insulative property is always maintained.

Here, as in an example of this embodiment shown in part (a) of FIG. 5, the inserting holes 801 are formed at least on the one end side and the other end side of the holding member 505 in the longitudinal direction of the holding member 505. By this, the substrate 502 is abutted against the jig pins 850 on both end sides of the substrate 502 in the longitudinal direction of the substrate 502. For that reason, the substrate 502 is stably supported by the jig pins 850.

Incidentally, by moving the jig pins 850 in this state in the optical axis direction of the lenses of the lens arrays 506, i.e., in the up-down direction, the position of the substrate 502 relative to the holding member 505 can also be finely adjusted.

As described above, a more preferable effect can be obtained by forming the inserting holes 801 on the one end side and on the other end side of the holding member 505 with respect to the longitudinal direction of the holding member 505.

Figure 11:
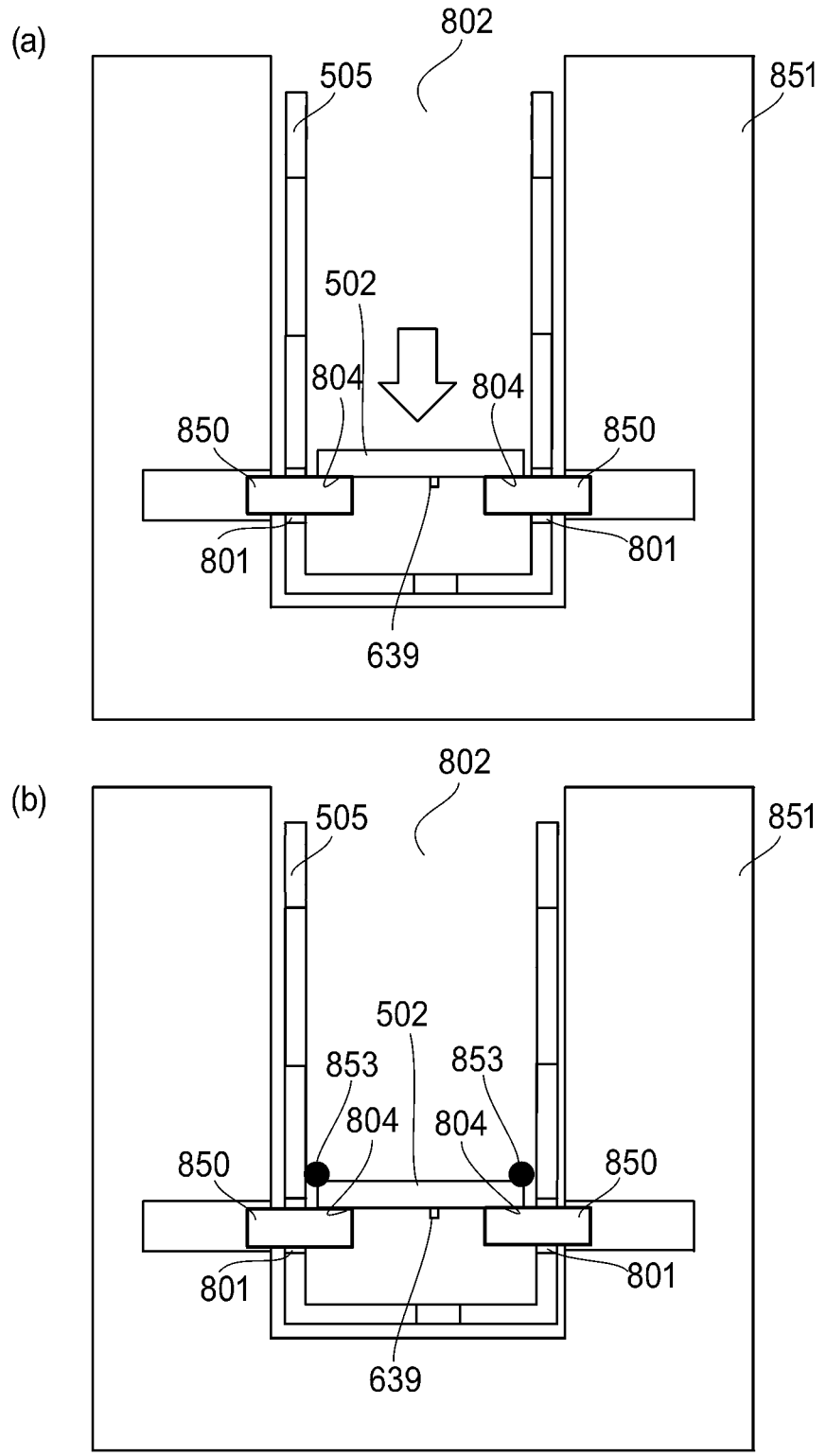
FIG. 11 includes views showing the substrate fixing step in the embodiment.

Next, as shown in part (b) of FIG. 11, the holding member 505 and the substrate 502 are bonded to each other by an adhesive 853, so that the substrate 502 is fixed to the holding member 505 (bonding step). Finally, as shown in part (a) of FIG. 12, the jig pins 850 are moved in arrow directions in part (a) of FIG. 12, and are extracted from the inserting holes 801 of the holding member 505. By this, the holding member 505 can be taken out of the substrate fixing jig 851.

As described above, between the jig pin 850 and the inserting hole 801, the gap is formed. In this state, the substrate 502 is abutted against the jig pin 850, so that the substrate 502 and the holding member 505 are fixed to each other, and therefore, a part of the end portion of the substrate 502 in the widthwise direction is necessarily exposed from the inserting hole 801. As long as a constitution in which the jig pin 850 is capable of being inserted into and extracted from the inserting hole 801 is employed, the part of the end portion of the substrate 502 in the widthwise direction of the substrate 502 is exposed from the inserting hole 801. In other words, of the one end of the substrate 502 in the widthwise direction of the substrate 502, the corner portion 502 as on a side where the light emitting elements are provided is always positioned at an overlapping position with the inserting hole 801 formed in the first side wall portion 505a in the widthwise direction of the substrate 502. Similarly, of the other end of the substrate 502 in the widthwise direction of the substrate 502, the corner portion 502bs on the side where the light emitting elements are provided is always provided at an overlapping position with the second side wall portion 505a in the widthwise direction of the substrate 502.

(Procedure 2: Substrate Sealing Step)

Next, the substrate sealing step will be described using part (b) of FIG. 12. Part (b) of FIG. 12 is a sectional view showing the substrate sealing step. First, as shown in part (b) of FIG. 12, the holding member 505 to which the substrate 502 is fixed is mounted in the substrate sealing jig 854 in a state in which the opening 802 faces upward. Specifically, the front pin end 516 and the rear pin end 517 of the holding member 505 are abutted against bearing surfaces (not shown) of the substrate sealing jig 854, so that the position of the holding member 505 is fixed. Next, into the gap 805 (see part (a) of FIG. 6) between the holding member 505 and the substrate 502, a sealing agent 856 is applied, so that sealing around the substrate 502 is carried out (first sealing step).

(Procedure 3: Sheet Sticking Step)

Figure 13:
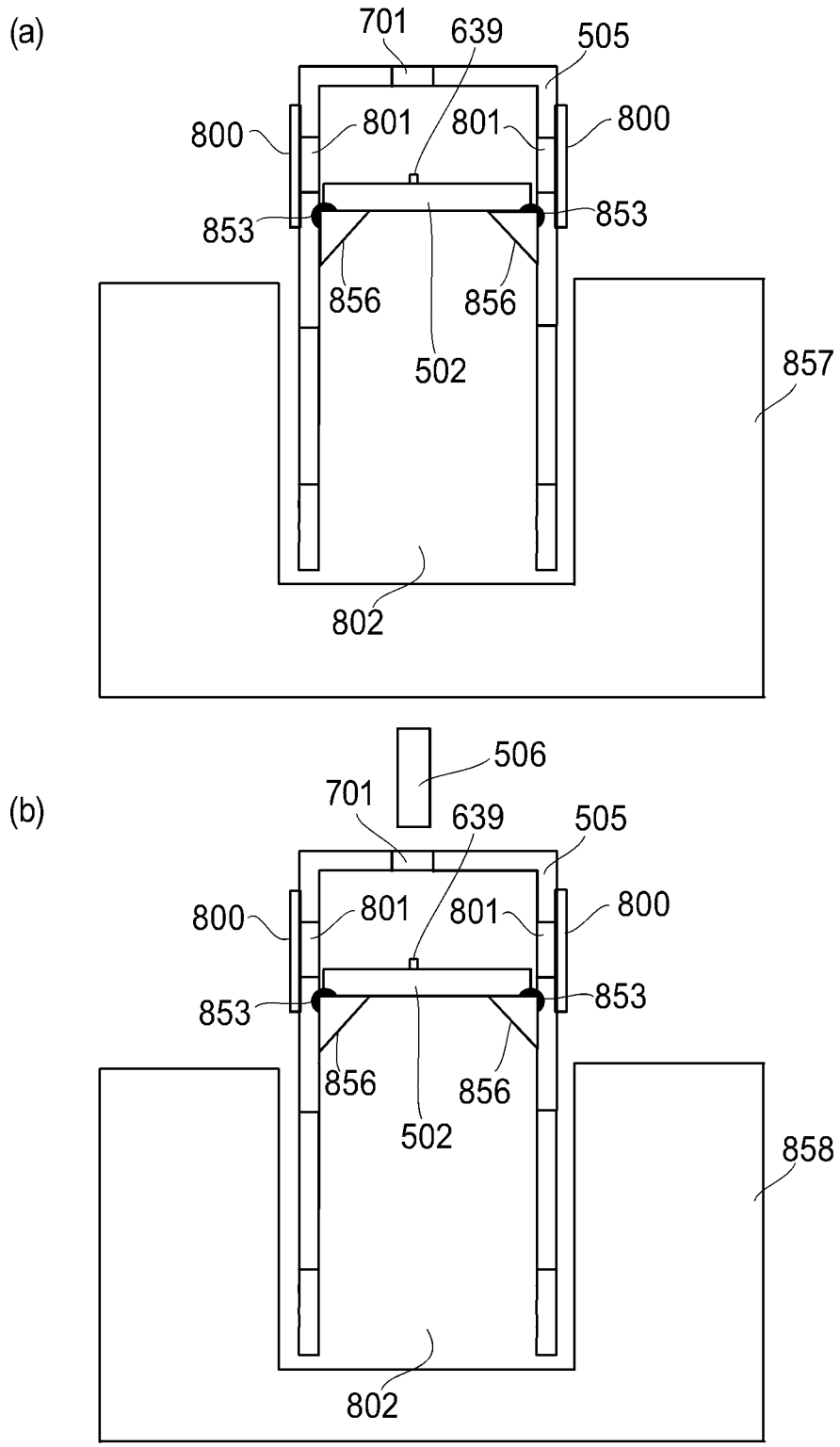
FIG. 13 includes views showing a sheet sticking step and a lens array fixing step in the embodiment.

Next, the sheet sticking step will be described using part (a) of FIG. 13. Part (a) of FIG. 13 is a sectional view showing the sheet sticking step. First, as shown in part (a) of FIG. 13, the holding member 505 is mounted in a sheet sticking table 857 in a state in which the opening 802 faces downward. Thereafter, the sheet member 800 is sticked so as to close (cover) all the plurality of the inserting holes 801 formed in both side surfaces of the holding member 505 (second sealing step). The sheet member 800 sealing the inserting holes 801 may also contact the corner portions 502as and 502bs of the substrate 502 which are exposed from the inserting holes 801. Incidentally, the sheet member 800 (an example of a sealing material) may also be a single sheet image continuous in the longitudinal direction so as to close all the inserting holes 801 as described in FIG. 3 and may also be a plurality of sheet members provided for closing the inserting holes 801, respectively.

(Procedure 4: lens Array Fixing Step)

Figure 14:
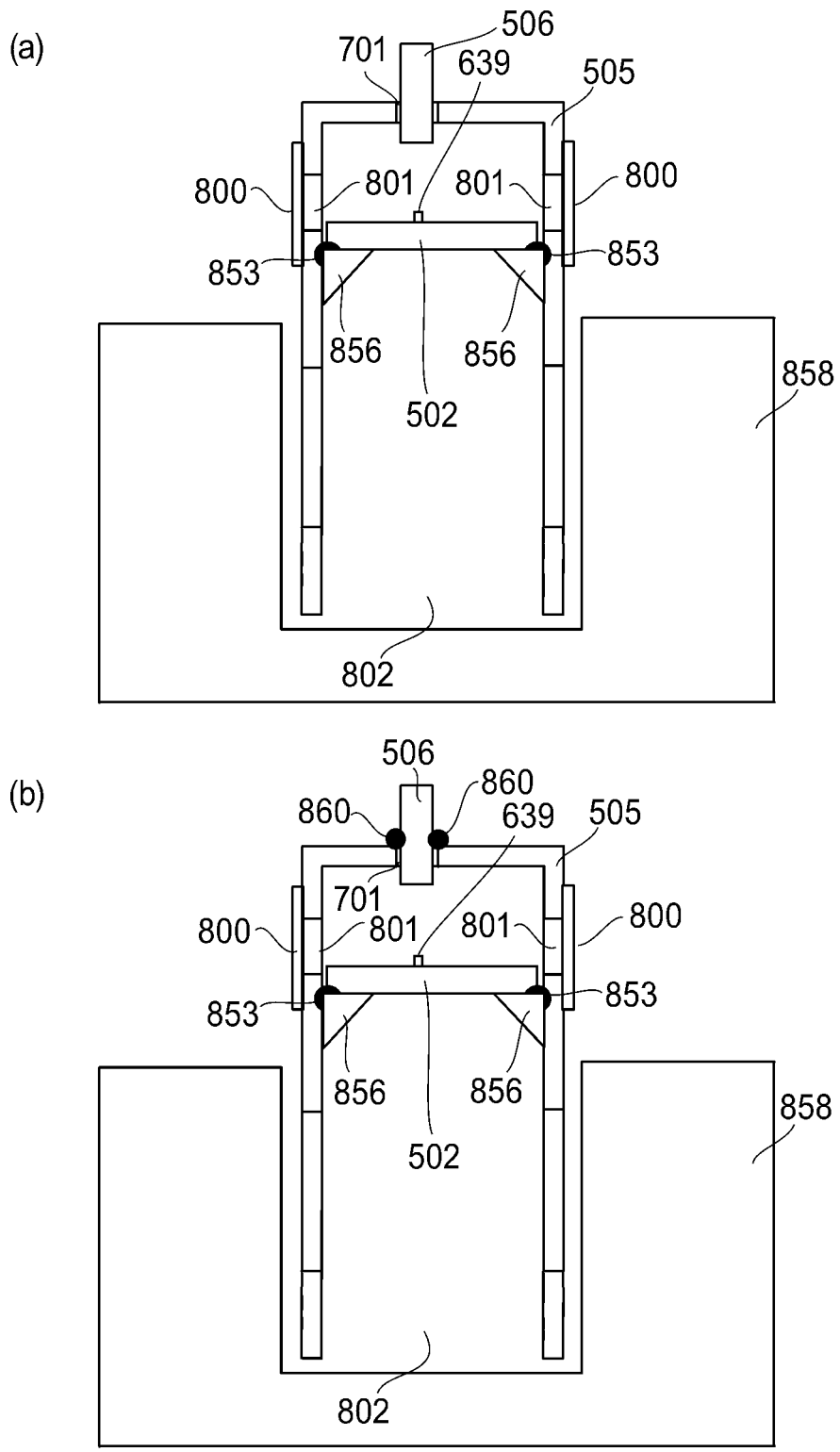
FIG. 14 includes views showing the lens array fixing step in the embodiment.
Figure 16:
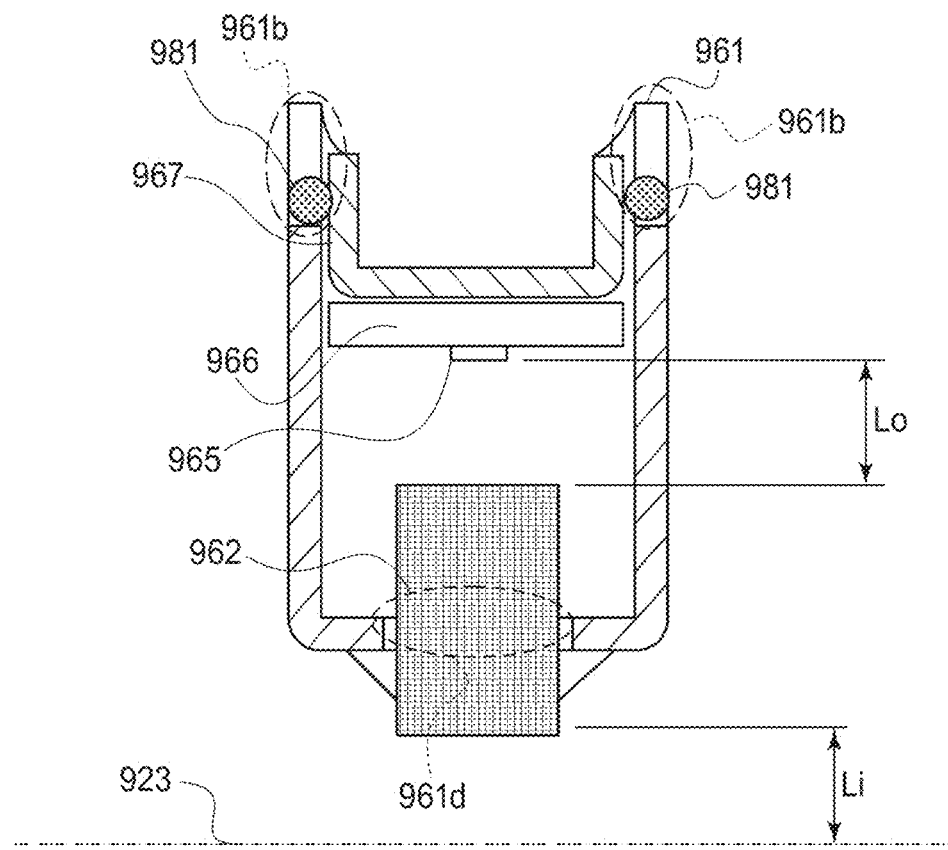
FIG. 16 is a sectional view showing an optical print head in a conventional example.

Next, the lens array fixing step will be described using part (b) of FIG. 13 to part (a) of FIG. 15. Part (b) of FIG. 13 to part (b) of FIG. 14 are sectional views showing the lens array fixing step and part (a) of FIG. 15 is a side view showing a method of positional adjustment of the lens array 506. First, as shown in part (b) of FIG. 13, the holding member 505 is mounted in a lens array fixing jig 858 in a state in which the opening 802 faces downward. Specifically, the front pin end 516 and the rear pin end 517 of the holding member 505 are abutted against bearing surfaces (not shown) of the lens array fixing jig 858, so that the position of the holding member 505 is fixed.

Thereafter, as shown in part (a) of FIG. 14, the lens array 506 is inserted into an inserting opening of the lens mounting portion 701 of the holding member 505. Next, as shown in part (b) of FIG. 14, after the positional adjustment of the lens array 506 is carried out, the holding member 505 and the lens array 506 are bonded to each other by the adhesive 860 (fixing step). The positional adjustment of the lens array 506 is carried out in the following manner. As shown in part (a) of FIG. 15, arms 861 of the casing fixing jig 858 hold both ends of the lens array 506 with respect to the longitudinal direction. The arms 861 move in arrow directions in part (a) of FIG. 15, whereby adjustment of the position and inclination of the lens array 506 with respect to the focus direction is performed so that distances between all the LED chips 639 mounted on the substrate 502 and the lens arrays 506 with respect to the focus direction become a predetermined value.

(Procedure 5: Sealing Step)

Next, the lens sealing step will be described using part (b) of FIG. 15. Part (b) of FIG. 15 is a sectional view showing the lens sealing step. As shown in part (b) of FIG. 15, the holding member 505 to which the substrate 502 is fixed is mounted in a lens sealing jig 862 in a state in which the opening 802 faces downward. Specifically, the front pin end 516 and the rear pin end 517 of the holding member 505 are abutted against bearing surfaces (not shown) of the lens sealing jig 862, so that the position of the holding member 505 is fixed. Next, into the gap 804 (see part (a) of FIG. 6) between the holding member 505 and the lens array 506, a sealing agent 863 is applied, so that sealing around the lens array 506 is carried out (third sealing step).

In this embodiment, the holding member 505 is provided with the cut-away portions 807, sealing around the substrate 502 is carried out by changing the substrate sealing step which is the procedure 2 of the above-described steps and the sheet sticking step which is the procedure 3 to each other. By the above-described procedures, when the optical print head 105 is assembled, there is no need to perform the position adjustment of the substrate 502 with respect to the focus direction, so that the light emitting element side of the substrate 502 are abutted against the jig pins of an assembling tool and thus assembling of the optical print head 105 can be carried out. By this the position of the substrate 502 with respect to the focus direction can be determined with accuracy.

INDUSTRIAL APPLICABILITY

According to the present invention, an optical print head, an image forming apparatus including the optical print head, and a manufacturing method of the optical print head which are capable of accurately positioning and fixing a substrate of the optical print head to a holding member by a simple method.

The present invention is not restricted to the foregoing embodiments, but can be variously changed and modified without departing from the spirit and the scope of the present invention. Accordingly, the following claims are attached hereto to make public the scope of the present invention.

This application claims the Conventional Priority from Japanese Patent Application 2019-091249 filed May 14, 2019, all disclosure of which is incorporated by reference herein.

The invention claimed is:

1. An exposure head for exposing a photosensitive member to light, comprising:
   an elongated substrate including a mounting surface on which a light emitting element is mounted, the light-emitting element being for emitting light to which the photosensitive member is exposed;
   a lens array for focusing light, emitted from said light emitting element, onto the photosensitive member; and
   an elongated holding member for holding said substrate and said lens array,
   wherein said holding member includes:
      a mounting portion in which an inserting opening for permitting insertion of said lens array is formed and to which said lens array is mounted,
      a first side wall which is continuous with one end of said mounting portion in a short direction of said holding member and which opposes one end of said substrate in the short direction with respect to the short direction; and a second side wall which is continuous with the other end of said holding member mounting portion in the short direction and which opposes the other end of said substrate in the short direction with respect to the short direction, wherein an opposite surface of said substrate on a side opposite from said mounting surface is fixed to said first side wall and said second side wall with an adhesive, wherein in said first side wall, a first opening through which a corner portion of the one end of said substrate on said mounting surface side is exposed is formed, wherein in said second side wall, a second opening through which a corner portion of the other end of said substrate on said mounting surface side is exposed is formed, wherein a corner portion of the one end of said substrate on the opposite surface side opposes a portion, of said first side wall, on a side opposite from a side where said mounting portion is positioned relative to said first opening in a direction crossing the short direction and a longitudinal direction of said holding member, wherein a corner portion of the other end of said substrate on the opposite surface side opposes a portion, of said second side wall, on a side opposite from a side where said mounting portion is positioned relative to said second opening in the direction crossing the short direction and the longitudinal direction, wherein with respect to a thickness direction of said substrate, a length of a portion, of the one end of said substrate, exposed from said first opening is shorter than a length of a portion, of said first opening, which does not oppose said substrate in the short direction, and wherein with respect to the thickness direction, a length of a portion, of the other end of said substrate, exposed from said second opening is shorter than a length of a portion, of said second opening, which does not oppose said substrate in the short direction.

2. The exposure head according to claim 1, wherein in said first side wall, a plurality of first openings are arranged and formed in the longitudinal direction, and in said second side wall, a plurality of second openings are arranged and formed in the longitudinal direction.

3. The exposure head according to claim 2, wherein said first openings are formed on one end side of said first side wall in the longitudinal direction and on the other end side of said first side wall in the longitudinal direction, and wherein said second openings are formed on one end side of said second side wall in the longitudinal direction and on the other end side of said second side wall in the longitudinal direction.

4. The exposure head according to claim 1, wherein said first opening and said second opening are formed in said holding member so as to oppose each other in the short direction.

5. The exposure head according to claim 1, wherein a gap between one end of a surface of said substrate on a side opposite from said mounting surface side and said first side wall and a gap between the other end of the side opposite from the side where said mounting portion is positioned and said second side wall are sealed by a sealing material.

6. The exposure head according to claim 1, wherein a length of said first opening and a length of said second opening in a thickness direction of said substrate are longer than a thickness of said substrate.

7. The exposure head according to claim 1, wherein said holding member comprises a plate made of metal.

8. An image forming apparatus comprising:
a photosensitive member;
an exposure head according to claim 1;
a developing unit for forming a toner image by developing, with toner, an electrostatic latent image formed on said photosensitive member by said exposure head; and
a transfer unit for transferring the toner image on a recording material.

9. An exposure head for exposing a photosensitive member to light, comprising:
an elongated substrate including a mounting surface on which a light emitting element is mounted, the light-emitting element being for emitting light to which the photosensitive member is exposed;
a lens array for focusing light, emitted from said light emitting element, onto the photosensitive member; and
an elongated holding member for holding said substrate and said lens array,
wherein said holding member includes:
a mounting portion in which an inserting opening for permitting insertion of said lens array is formed and to which said lens array is mounted,
a first side wall which is continuous with one end of said mounting portion in a short direction of said holding member and which opposes one end of said substrate in the short direction with respect to the short direction, wherein a first opening overlapping with a corner portion of the one end of said substrate on said mounting surface side in the short direction is formed as viewed along the short direction; and
a second side wall which is continuous with the other end of said mounting portion in the short direction of said holding member and which opposes the other end of said substrate in the short direction with respect to the short direction, wherein a second opening overlapping with a corner portion of the other end of said substrate on said mounting surface side in the short direction is formed as viewed along the short direction, wherein an opposite surface of said substrate on a side opposite from said mounting surface is fixed to said first side wall and said second side wall by an adhesive, wherein a corner portion of the one end of said substrate on the opposite surface side opposes a portion, of said first side wall, on a side opposite from a side where said mounting portion is positioned relative to said first opening in a direction crossing the short direction and a longitudinal direction of said holding member, wherein a corner portion of the other end of said substrate on the opposite surface side opposes a portion, of said second side wall, on a side opposite from a side where said mounting portion is positioned relative to said second opening in the direction crossing the short direction and the longitudinal direction, wherein said first opening and said second opening are sealed by being covered by a sealing material, wherein a region of a portion of said first opening which does not overlap with said substrate in the short direction is wider than a region of a portion of said first opening overlapping with the one end of said substrate in the short direction, and wherein a region of a portion of said second opening which does not overlap with said substrate in the short direction is wider than a region of a portion of said second opening overlapping with the one end of said substrate in the short direction.

10. The exposure head according to claim 9, wherein in said first side wall, a plurality of first openings are arranged and formed in the longitudinal direction, and in said second side wall, a plurality of second openings are arranged and formed in the longitudinal direction.

11. The exposure head according to claim 10, wherein said first openings are formed on one end side of said first side wall in the longitudinal direction and on the other end side of said first side wall in the longitudinal direction, and wherein said second openings are formed on one end side of said second side wall in the longitudinal direction and on the other end side of said second side wall in the longitudinal direction.

12. The exposure head according to claim 9, wherein said first opening and said second opening are formed in said holding member so as to oppose each other in the short direction.

13. The exposure head according to claim 9, wherein the sealing material sealing said first opening contacts said corner portion of the one end of said substrate on said mounting surface side, and wherein the sealing material sealing said second opening contacts said corner portion of the other end of said substrate on said mounting surface side.

14. The exposure head according to claim 9, wherein a length of said first opening and a length of said second opening in a thickness direction of said substrate are longer than a thickness of said substrate.

15. The exposure head according to claim 9, wherein said holding member comprises a plate made of metal.

16. An image forming apparatus comprising:
a photosensitive member;
an exposure head according to claim 9;
a developing unit for forming a toner image by developing, with toner, an electrostatic latent image formed on said photosensitive member by said exposure head; and
a transfer unit for transferring the toner image on a recording material.

* * * * *